(12) United States Patent
Thibault et al.

(10) Patent No.: US 8,023,500 B2
(45) Date of Patent: *Sep. 20, 2011

(54) METHODS FOR PROCESS CONTROL WITH CHANGE UPDATES

(75) Inventors: Richard L. Thibault, Wrentham, MA (US); Bruce S. Canna, Mansfield, MA (US); Gerald S. Couper, Pepperell, MA (US)

(73) Assignee: Invensys Systems, Inc., Foxboro, MA (US)

( * ) Notice: Subject to any disclaimer, the term of this patent is extended or adjusted under 35 U.S.C. 154(b) by 990 days.

This patent is subject to a terminal disclaimer.

(21) Appl. No.: 11/929,683

(22) Filed: Oct. 30, 2007

(65) Prior Publication Data

US 2008/0134215 A1    Jun. 5, 2008

Related U.S. Application Data

(63) Continuation of application No. 10/765,006, filed on Jan. 26, 2004, now Pat. No. 7,502,656, which is a continuation of application No. 09/379,074, filed on Aug. 23, 1999, now Pat. No. 6,799,195, which is a continuation of application No. 08/700,199, filed on Aug. 20, 1996, now abandoned.

(51) Int. Cl.
    *H04Q 11/00*       (2006.01)
(52) U.S. Cl. .................................... 370/386; 370/388
(58) Field of Classification Search .................. 370/388, 370/313; 709/203, 217, 220, 208
See application file for complete search history.

(56) References Cited

U.S. PATENT DOCUMENTS 3,096,434 A    7/1963  King
3,404,264 A   10/1968  Kugler
3,665,172 A    5/1972  Spaargaren et al.
3,701,280 A   10/1972  Stroman (Continued)

FOREIGN PATENT DOCUMENTS

EP            0592921         4/1994

(Continued)

OTHER PUBLICATIONS

Fieldbus Inc. "The Foundation™ filedbus Primer," Revision 1.1, Released Jun. 24, 2001, 36 pages.

(Continued)

*Primary Examiner* — Thong Vu
(74) *Attorney, Agent, or Firm* — Nutter McClennen & Fish LLP; David J. Powsner; Derek Roller

(57) ABSTRACT

A system for process control comprises a server digital data processor and a client digital data processor that are coupled by a network, such as the Internet or an Intranet. The server digital data processor, which is additionally coupled to a control/sensing device and any associated interface equipment (collectively, referred to as "process control apparatus"), includes a command processor that transfers information between the network and the process control apparatus. The client digital data processor includes an information client (e.g., a so-called Internet web browser) capable of requesting and receiving an applet from the server digital data processor. The information client, further, defines a hardware-independent and operating system-independent virtual machine environment within the client digital data processor. The client digital data processor executes, within that virtual machine environment, an applet for configuring the client digital data processor as a "process controller" that establishes communications over the network with the command processor and that monitors and/or controls the process control apparatus via those communications.

16 Claims, 2 Drawing Sheets

U.S. PATENT DOCUMENTS

| | | | |
|---|---|---|---|
| 3,802,590 A | 4/1974 | Culver | |
| 3,810,119 A | 5/1974 | Zieve et al. | |
| 3,825,905 A | 7/1974 | Allen, Jr. | |
| 3,959,772 A | 5/1976 | Wakasa et al. | |
| 4,006,464 A | 2/1977 | Landell | |
| RE29,383 E | 9/1977 | Gallatin et al. | |
| 4,058,975 A | 11/1977 | Gilbert et al. | |
| 4,096,566 A | 6/1978 | Borie et al. | |
| 4,276,593 A | 6/1981 | Hansen | |
| 4,302,820 A | 11/1981 | Struger et al. | |
| 4,312,068 A | 1/1982 | Goss et al. | |
| 4,323,966 A | 4/1982 | Whiteside et al. | |
| 4,347,563 A | 8/1982 | Paredes et al. | |
| 4,351,023 A | 9/1982 | Richer | |
| 4,377,000 A | 3/1983 | Staab | |
| 4,410,942 A | 10/1983 | Milligan et al. | |
| 4,413,314 A | 11/1983 | Slater et al. | |
| 4,423,486 A | 12/1983 | Berner | |
| 4,428,044 A | 1/1984 | Liron | |
| 4,435,762 A | 3/1984 | Milligan et al. | |
| 4,443,861 A | 4/1984 | Slater | |
| 4,456,997 A | 6/1984 | Spitza et al. | |
| 4,466,098 A | 8/1984 | Southard | |
| 4,471,457 A | 9/1984 | Videki, II | |
| 4,488,226 A | 12/1984 | Wagner, Jr. et al. | |
| 4,493,027 A | 1/1985 | Katz et al. | |
| 4,530,234 A | 7/1985 | Cullick et al. | |
| 4,609,995 A | 9/1986 | Hasebe et al. | |
| 4,612,620 A | 9/1986 | Davis et al. | |
| 4,615,001 A | 9/1986 | Hudgins, Jr. | |
| 4,628,437 A | 12/1986 | Poschmann et al. | |
| 4,633,217 A | 12/1986 | Akano | |
| 4,639,852 A | 1/1987 | Motomiya | |
| 4,641,269 A | 2/1987 | Japenga et al. | |
| 4,641,276 A | 2/1987 | Dunki-Jacobs | |
| 4,648,064 A | 3/1987 | Morley | |
| 4,649,479 A | 3/1987 | Advani et al. | |
| 4,663,704 A | 5/1987 | Jones et al. | |
| 4,672,530 A | 6/1987 | Schuss | |
| 4,675,812 A | 6/1987 | Capowski et al. | |
| 4,682,158 A | 7/1987 | Ito et al. | |
| 4,682,304 A | 7/1987 | Tierney | |
| 4,683,530 A | 7/1987 | Quatse | |
| 4,692,859 A | 9/1987 | Ott | |
| 4,692,918 A | 9/1987 | Elliott et al. | |
| 4,703,421 A | 10/1987 | Abrant et al. | |
| 4,704,676 A | 11/1987 | Flanagan et al. | |
| 4,709,325 A | 11/1987 | Yajima et al. | |
| 4,719,593 A | 1/1988 | Threewitt et al. | |
| 4,727,477 A | 2/1988 | Gavril | |
| 4,733,366 A | 3/1988 | Deyesso et al. | |
| 4,740,955 A | 4/1988 | Litterer et al. | |
| 4,742,349 A | 5/1988 | Miesterfeld et al. | |
| 4,750,109 A | 6/1988 | Kita et al. | |
| 4,770,841 A | 9/1988 | Haley et al. | |
| 4,790,762 A | 12/1988 | Harms et al. | |
| 4,800,512 A | 1/1989 | Busch | |
| 4,805,107 A | 2/1989 | Kieckhafer et al. | |
| 4,806,905 A | 2/1989 | McGowan, III et al. | |
| 4,816,996 A | 3/1989 | Hill et al. | |
| 4,817,094 A | 3/1989 | Lebizay et al. | |
| 4,839,854 A | 6/1989 | Sakami et al. | |
| 4,872,106 A | 10/1989 | Slater | |
| 4,885,707 A | 12/1989 | Nichol et al. | |
| 4,896,290 A | 1/1990 | Rhodes et al. | |
| 4,897,777 A | 1/1990 | Janke et al. | |
| RE33,162 E | 2/1990 | Yoshida et al. | |
| 4,910,658 A | 3/1990 | Dudash et al. | |
| 4,910,691 A | 3/1990 | Skeirik | |
| 4,918,690 A | 4/1990 | Markkula, Jr. et al. | |
| 4,924,462 A | 5/1990 | Sojka | |
| 4,926,158 A | 5/1990 | Zeigler | |
| 4,934,196 A | 6/1990 | Romano | |
| 4,940,974 A | 7/1990 | Sojka | |
| 4,958,277 A | 9/1990 | Hill et al. | |
| 4,959,774 A | 9/1990 | Davis | |
| 4,965,717 A | 10/1990 | Cutts, Jr. et al. | |
| 4,965,742 A | 10/1990 | Skeirik | |
| 4,965,880 A | 10/1990 | Petitjean et al. | |
| 4,991,076 A | 2/1991 | Zifferer et al. | |
| 4,991,170 A | 2/1991 | Kem | |
| 5,008,805 A | 4/1991 | Fiebig et al. | |
| 5,050,165 A | 9/1991 | Yoshioka et al. | |
| 5,068,778 A | 11/1991 | Kosem et al. | |
| 5,089,927 A | 2/1992 | Bulan et al. | |
| 5,089,974 A | 2/1992 | Demeyer et al. | |
| 5,109,692 A | 5/1992 | Fitzgerald | |
| 5,121,318 A | 6/1992 | Lipner et al. | |
| 5,122,948 A | 6/1992 | Zapolin | |
| 5,124,908 A | 6/1992 | Broadbent | |
| 5,129,087 A | 7/1992 | Will | |
| 5,131,092 A | 7/1992 | Sackmann et al. | |
| 5,134,574 A | 7/1992 | Beaverstock et al. | |
| 5,136,704 A | 8/1992 | Danielsen et al. | |
| 5,138,708 A | 8/1992 | Vosbury | |
| 5,140,677 A | 8/1992 | Fleming et al. | |
| 5,146,589 A | 9/1992 | Peet, Jr. et al. | |
| 5,150,289 A | 9/1992 | Badavas | |
| 5,151,930 A | 9/1992 | Hagl | |
| 5,151,978 A | 9/1992 | Bronikowski et al. | |
| 5,151,981 A | 9/1992 | Westcott et al. | |
| 5,159,673 A | 10/1992 | Sackmann et al. | |
| 5,162,986 A | 11/1992 | Graber et al. | |
| 5,163,055 A | 11/1992 | Lee et al. | |
| 5,164,894 A | 11/1992 | Cunningham-Reid et al. | |
| 5,166,685 A | 11/1992 | Campbell, Jr. et al. | |
| 5,167,009 A | 11/1992 | Skeirik | |
| 5,168,276 A | 12/1992 | Huston et al. | |
| 5,168,441 A | 12/1992 | Onarheim et al. | |
| 5,170,340 A | 12/1992 | Prokop et al. | |
| 5,175,698 A | 12/1992 | Barbanell | |
| 5,175,829 A | 12/1992 | Stumpf et al. | |
| 5,181,978 A | 1/1993 | Ochiai | |
| 5,193,175 A | 3/1993 | Cutts, Jr. et al. | |
| 5,197,114 A | 3/1993 | Skeirik | |
| 5,202,961 A | 4/1993 | Mills et al. | |
| 5,212,784 A | 5/1993 | Sparks | |
| 5,218,187 A | 6/1993 | Koenck et al. | |
| 5,224,203 A | 6/1993 | Skeirik | |
| 5,233,615 A | 8/1993 | Goetz | |
| 5,245,704 A | 9/1993 | Weber et al. | |
| 5,249,274 A | 9/1993 | Sztipanovits et al. | |
| 5,251,125 A | 10/1993 | Karnowski et al. | |
| 5,255,367 A | 10/1993 | Bruckert et al. | |
| 5,257,208 A | 10/1993 | Brown et al. | |
| 5,258,999 A | 11/1993 | Wernimont et al. | |
| 5,271,013 A | 12/1993 | Gleeson | |
| 5,276,901 A | 1/1994 | Howell et al. | |
| 5,283,729 A | 2/1994 | Lloyd | |
| 5,289,365 A | 2/1994 | Caldwell et al. | |
| 5,291,390 A | 3/1994 | Satou et al. | |
| 5,295,258 A | 3/1994 | Jewett et al. | |
| 5,295,263 A | 3/1994 | Kojima et al. | |
| 5,297,143 A | 3/1994 | Fridrich et al. | |
| 5,301,346 A | 4/1994 | Notarianni et al. | |
| 5,302,952 A | 4/1994 | Campbell, Jr. et al. | |
| 5,303,227 A | 4/1994 | Herold et al. | |
| 5,303,375 A | 4/1994 | Collins et al. | |
| 5,303,392 A | 4/1994 | Carney et al. | |
| 5,307,346 A | 4/1994 | Fieldhouse | |
| 5,307,372 A | 4/1994 | Sawyer et al. | |
| 5,307,463 A | 4/1994 | Hyatt et al. | |
| 5,309,556 A | 5/1994 | Sismilich | |
| 5,310,998 A | 5/1994 | Okuno et al. | |
| 5,317,726 A | 5/1994 | Horst | |
| 5,325,339 A | 6/1994 | Yost et al. | |
| 5,327,144 A | 7/1994 | Stilp et al. | |
| 5,335,186 A | 8/1994 | Tarrant | |
| 5,335,221 A | 8/1994 | Snowbarger et al. | |
| 5,339,362 A | 8/1994 | Harris | |
| 5,339,680 A | 8/1994 | Bronkal et al. | |
| 5,347,181 A | 9/1994 | Ashby et al. | |
| 5,349,343 A | 9/1994 | Oliver | |
| 5,349,678 A | 9/1994 | Morris et al. | |
| 5,352,033 A | 10/1994 | Gresham et al. | |
| 5,353,217 A | 10/1994 | Berghs et al. | |
| 5,359,721 A | 10/1994 | Kempf et al. | |

| Patent | Date | Name |
|---|---|---|
| 5,361,198 A | 11/1994 | Harmon et al. |
| 5,367,640 A | 11/1994 | Hamilton et al. |
| 5,371,895 A | 12/1994 | Bristol |
| 5,377,315 A | 12/1994 | Leggett |
| 5,381,529 A | 1/1995 | Matsushima |
| 5,384,910 A | 1/1995 | Torres |
| 5,386,373 A | 1/1995 | Keeler et al. |
| 5,386,417 A | 1/1995 | Daugherty et al. |
| 5,390,321 A | 2/1995 | Proesel |
| 5,392,280 A | 2/1995 | Zheng |
| 5,392,389 A | 2/1995 | Fleming |
| 5,394,522 A | 2/1995 | Sanchez-Frank et al. |
| 5,398,331 A | 3/1995 | Huang et al. |
| 5,400,140 A | 3/1995 | Johnston |
| 5,405,779 A | 4/1995 | McCabe et al. |
| 5,408,603 A | 4/1995 | Van de Lavoir et al. |
| 5,410,141 A | 4/1995 | Koenck et al. |
| 5,410,492 A | 4/1995 | Gross et al. |
| 5,410,717 A | 4/1995 | Floro |
| 5,420,977 A | 5/1995 | Sztipanovits et al. |
| 5,421,017 A | 5/1995 | Scholz et al. |
| 5,422,816 A | 6/1995 | Sprague et al. |
| 5,426,732 A | 6/1995 | Boies et al. |
| 5,428,734 A | 6/1995 | Haynes et al. |
| 5,428,769 A | 6/1995 | Glaser et al. |
| 5,428,781 A | 6/1995 | Duault et al. |
| 5,432,705 A | 7/1995 | Severt et al. |
| 5,432,711 A | 7/1995 | Jackson et al. |
| 5,434,952 A | 7/1995 | Yen et al. |
| 5,434,997 A | 7/1995 | Landry et al. |
| 5,437,007 A | 7/1995 | Bailey et al. |
| 5,440,237 A | 8/1995 | Brown et al. |
| 5,442,639 A | 8/1995 | Crowder et al. |
| 5,442,791 A | 8/1995 | Wrabetz et al. |
| 5,444,851 A | 8/1995 | Woest |
| 5,444,861 A | 8/1995 | Adamec et al. |
| 5,450,403 A | 9/1995 | Ichii et al. |
| 5,450,425 A | 9/1995 | Gunn et al. |
| 5,450,764 A | 9/1995 | Johnston et al. |
| 5,451,923 A | 9/1995 | Seberger et al. |
| 5,451,939 A | 9/1995 | Price et al. |
| 5,452,201 A | 9/1995 | Pieronek et al. |
| 5,453,933 A | 9/1995 | Wright et al. |
| 5,457,797 A | 10/1995 | Butterworth et al. |
| 5,459,825 A | 10/1995 | Anderson et al. |
| 5,459,839 A | 10/1995 | Swarts et al. |
| 5,461,611 A | 10/1995 | Drake, Jr. et al. |
| 5,461,710 A | 10/1995 | Bloomfield et al. |
| 5,463,735 A | 10/1995 | Pascucci et al. |
| 5,467,264 A | 11/1995 | Rauch et al. |
| 5,469,150 A | 11/1995 | Sitte |
| 5,469,570 A | 11/1995 | Shibata et al. |
| 5,475,856 A | 12/1995 | Kogge |
| 5,481,715 A | 1/1996 | Hamilton et al. |
| 5,481,718 A | 1/1996 | Ryu et al. |
| 5,481,741 A | 1/1996 | McKaskle et al. |
| 5,483,660 A | 1/1996 | Yishay et al. |
| 5,485,617 A | 1/1996 | Stutz et al. |
| 5,485,620 A | 1/1996 | Sadre et al. |
| 5,490,276 A | 2/1996 | Doli, Jr. et al. |
| 5,491,625 A | 2/1996 | Pressnall et al. |
| 5,491,791 A | 2/1996 | Glowny et al. |
| 5,493,534 A | 2/1996 | Mok |
| 5,499,023 A | 3/1996 | Goldschmidt |
| 5,499,365 A | 3/1996 | Anderson et al. |
| 5,499,371 A | 3/1996 | Henninger et al. |
| 5,500,934 A | 3/1996 | Austin et al. |
| 5,501,608 A | 3/1996 | Scheer et al. |
| 5,504,672 A | 4/1996 | Hardiman et al. |
| 5,504,895 A | 4/1996 | Kurosawa et al. |
| 5,504,902 A | 4/1996 | McGrath et al. |
| 5,509,811 A | 4/1996 | Homic |
| 5,513,095 A | 4/1996 | Pajonk et al. |
| 5,513,192 A | 4/1996 | Janku et al. |
| 5,513,354 A | 4/1996 | Dwork et al. |
| 5,517,645 A | 5/1996 | Stutz et al. |
| 5,517,655 A | 5/1996 | Collins et al. |
| 5,519,605 A | 5/1996 | Cawlfield |
| 5,519,701 A | 5/1996 | Colmant et al. |
| 5,522,044 A | 5/1996 | Pascucci et al. |
| 5,526,287 A | 6/1996 | French |
| 5,526,353 A | 6/1996 | Henley et al. |
| 5,530,377 A | 6/1996 | Walls |
| 5,530,643 A | 6/1996 | Hodorowski |
| 5,530,868 A | 6/1996 | Record et al. |
| 5,531,328 A | 7/1996 | Rochelo et al. |
| 5,534,912 A | 7/1996 | Kostreski |
| 5,535,425 A | 7/1996 | Watanabe |
| 5,537,548 A | 7/1996 | Fin et al. |
| 5,539,638 A | 7/1996 | Keeler et al. |
| 5,539,909 A | 7/1996 | Tanaka et al. |
| 5,541,810 A | 7/1996 | Donhauser et al. |
| 5,544,008 A | 8/1996 | Dimmick et al. |
| 5,544,073 A | 8/1996 | Piety et al. |
| 5,544,321 A | 8/1996 | Theimer et al. |
| 5,548,528 A | 8/1996 | Keeler et al. |
| 5,549,137 A | 8/1996 | Lenz et al. |
| 5,550,980 A | 8/1996 | Pascucci et al. |
| 5,551,047 A | 8/1996 | Mori et al. |
| 5,555,213 A | 9/1996 | DeLong |
| 5,555,416 A | 9/1996 | Owens et al. |
| 5,555,437 A | 9/1996 | Packer |
| 5,555,510 A | 9/1996 | Verseput et al. |
| 5,557,559 A | 9/1996 | Rhodes |
| 5,559,691 A | 9/1996 | Monta et al. |
| 5,559,963 A | 9/1996 | Gregg et al. |
| 5,561,770 A | 10/1996 | de Bruijn et al. |
| 5,563,400 A | 10/1996 | Le Roux et al. |
| 5,564,055 A | 10/1996 | Asnaashari et al. |
| 5,566,320 A | 10/1996 | Hubert |
| 5,568,378 A | 10/1996 | Wojsznis |
| 5,570,300 A | 10/1996 | Henry et al. |
| 5,572,643 A | 11/1996 | Judson |
| 5,572,673 A | 11/1996 | Shurts |
| 5,576,946 A | 11/1996 | Bender et al. |
| 5,579,220 A | 11/1996 | Barthel et al. |
| 5,579,487 A | 11/1996 | Meyerson et al. |
| 5,581,760 A | 12/1996 | Atkinson et al. |
| 5,586,066 A | 12/1996 | White et al. |
| 5,586,112 A | 12/1996 | Tabata et al. |
| 5,586,156 A | 12/1996 | Gaubatz |
| 5,586,329 A | 12/1996 | Knudsen et al. |
| 5,586,330 A | 12/1996 | Knudsen et al. |
| 5,587,899 A | 12/1996 | Ho et al. |
| 5,594,858 A | 1/1997 | Blevins |
| 5,594,899 A | 1/1997 | Knudsen et al. |
| 5,596,331 A | 1/1997 | Bonaffini et al. |
| 5,596,752 A | 1/1997 | Knudsen et al. |
| 5,598,536 A | 1/1997 | Slaughter, III et al. |
| 5,598,566 A | 1/1997 | Pascucci et al. |
| 5,600,845 A | 2/1997 | Gilson |
| 5,602,749 A | 2/1997 | Vosburgh |
| 5,604,737 A | 2/1997 | Iwami et al. |
| 5,604,871 A | 2/1997 | Pecone |
| 5,608,607 A | 3/1997 | Dittmer |
| 5,608,608 A | 3/1997 | Flint et al. |
| 5,611,057 A | 3/1997 | Pecone et al. |
| 5,613,148 A | 3/1997 | Bezviner et al. |
| 5,613,164 A | 3/1997 | DiAngelo et al. |
| 5,613,190 A | 3/1997 | Hylton |
| 5,617,540 A | 4/1997 | Civanlar et al. |
| 5,621,871 A | 4/1997 | Jaremko et al. |
| 5,621,890 A | 4/1997 | Notarianni et al. |
| 5,623,592 A | 4/1997 | Carlson et al. |
| 5,623,670 A | 4/1997 | Bohannon et al. |
| 5,627,979 A | 5/1997 | Chang et al. |
| 5,629,872 A | 5/1997 | Gross et al. |
| 5,629,949 A | 5/1997 | Zook |
| 5,630,056 A | 5/1997 | Horvath et al. |
| 5,630,152 A | 5/1997 | DeLuca et al. |
| 5,633,811 A | 5/1997 | Canada et al. |
| 5,642,259 A | 6/1997 | Ma et al. |
| 5,642,511 A | 6/1997 | Chow et al. |
| 5,648,768 A | 7/1997 | Bouve |
| 5,649,121 A | 7/1997 | Budman et al. |
| 5,655,092 A | 8/1997 | Ojala et al. |
| 5,659,680 A | 8/1997 | Cunningham et al. |
| 5,659,727 A | 8/1997 | Velissaropoulos et al. |

| Patent No. | Date | Inventor(s) |
|---|---|---|
| 5,664,101 A | 9/1997 | Picache |
| 5,664,168 A | 9/1997 | Yishay et al. |
| 5,671,374 A | 9/1997 | Postman et al. |
| 5,671,436 A | 9/1997 | Morris et al. |
| 5,676,141 A | 10/1997 | Hollub |
| 5,680,404 A | 10/1997 | Gray et al. |
| 5,680,409 A | 10/1997 | Qin et al. |
| 5,682,317 A | 10/1997 | Keeler et al. |
| 5,682,476 A | 10/1997 | Tapperson et al. |
| 5,687,316 A | 11/1997 | Graziano et al. |
| 5,691,897 A | 11/1997 | Brown et al. |
| 5,700,090 A | 12/1997 | Eryurek |
| 5,701,414 A | 12/1997 | Cheng et al. |
| 5,701,484 A | 12/1997 | Artsy |
| 5,704,011 A | 12/1997 | Hansen et al. |
| 5,706,502 A | 1/1998 | Foley et al. |
| 5,708,709 A | 1/1998 | Rose |
| 5,708,779 A | 1/1998 | Graziano et al. |
| 5,713,045 A | 1/1998 | Berdahl |
| 5,715,178 A | 2/1998 | Scarola et al. |
| 5,716,221 A | 2/1998 | Kantner |
| 5,717,880 A | 2/1998 | Imai et al. |
| 5,717,925 A | 2/1998 | Harper et al. |
| 5,719,761 A | 2/1998 | Gatti et al. |
| 5,724,025 A | 3/1998 | Tavori |
| 5,726,911 A | 3/1998 | Canada et al. |
| 5,726,912 A | 3/1998 | Krall, Jr. et al. |
| 5,727,128 A | 3/1998 | Morrison |
| 5,732,074 A * | 3/1998 | Spaur et al. .................. 370/313 |
| 5,732,218 A | 3/1998 | Bland et al. |
| 5,734,902 A | 3/1998 | Atkins et al. |
| 5,737,529 A | 4/1998 | Dolin, Jr. et al. |
| 5,740,429 A | 4/1998 | Wang et al. |
| 5,740,441 A | 4/1998 | Yellin et al. |
| 5,742,596 A | 4/1998 | Baratz et al. |
| 5,742,762 A | 4/1998 | Scholl et al. |
| 5,745,049 A | 4/1998 | Akiyama et al. |
| 5,746,511 A | 5/1998 | Eryurek et al. |
| 5,748,467 A | 5/1998 | Qin et al. |
| 5,748,896 A | 5/1998 | Daly et al. |
| 5,748,912 A | 5/1998 | Lee |
| 5,751,574 A | 5/1998 | Loebig |
| 5,752,007 A | 5/1998 | Morrison |
| 5,752,008 A | 5/1998 | Bowling |
| 5,752,246 A | 5/1998 | Rogers et al. |
| 5,754,189 A | 5/1998 | Doi et al. |
| 5,754,772 A | 5/1998 | Leaf |
| 5,754,830 A | 5/1998 | Butts et al. |
| 5,757,925 A | 5/1998 | Faybishenko |
| 5,758,073 A | 5/1998 | Liang et al. |
| 5,758,075 A | 5/1998 | Graziano et al. |
| 5,761,033 A | 6/1998 | Wilhelm |
| 5,761,090 A | 6/1998 | Gross et al. |
| 5,761,405 A | 6/1998 | Tadamura et al. |
| 5,761,421 A | 6/1998 | van Hoff et al. |
| 5,761,477 A | 6/1998 | Wahbe et al. |
| 5,761,499 A | 6/1998 | Sonderegger |
| 5,761,518 A | 6/1998 | Boehling et al. |
| 5,764,906 A | 6/1998 | Edelstein et al. |
| 5,768,119 A | 6/1998 | Havekost et al. |
| 5,768,510 A | 6/1998 | Gish |
| 5,774,378 A | 6/1998 | Yang et al. |
| 5,774,670 A | 6/1998 | Montulli |
| 5,777,874 A | 7/1998 | Flood et al. |
| 5,778,368 A | 7/1998 | Hogan et al. |
| 5,784,557 A | 7/1998 | Oprescu |
| 5,787,247 A | 7/1998 | Norin et al. |
| 5,787,272 A | 7/1998 | Gupta et al. |
| 5,787,280 A | 7/1998 | Joseph et al. |
| 5,790,791 A | 8/1998 | Chong et al. |
| 5,793,963 A | 8/1998 | Tapperson et al. |
| 5,794,071 A | 8/1998 | Watanabe et al. |
| 5,796,602 A | 8/1998 | Wellan et al. |
| 5,797,038 A | 8/1998 | Crawford et al. |
| 5,801,770 A | 9/1998 | Paff et al. |
| 5,801,942 A | 9/1998 | Nixon et al. |
| 5,802,389 A | 9/1998 | McNutt |
| 5,805,153 A | 9/1998 | Nielsen |
| 5,805,442 A * | 9/1998 | Crater et al. .................. 700/9 |
| 5,805,889 A | 9/1998 | Van De Vanter |
| 5,805,922 A | 9/1998 | Sim et al. |
| 5,809,247 A | 9/1998 | Richardson et al. |
| 5,812,394 A | 9/1998 | Lewis et al. |
| 5,815,152 A | 9/1998 | Collier et al. |
| 5,815,659 A | 9/1998 | Umetsu et al. |
| 5,815,710 A | 9/1998 | Martin et al. |
| 5,822,220 A | 10/1998 | Baines |
| 5,828,567 A | 10/1998 | Eryurek et al. |
| 5,828,851 A | 10/1998 | Nixon et al. |
| 5,828,882 A | 10/1998 | Hinckley |
| 5,831,669 A | 11/1998 | Adrain |
| 5,832,268 A | 11/1998 | Anderson et al. |
| 5,832,418 A | 11/1998 | Meyer |
| 5,835,704 A | 11/1998 | Li et al. |
| 5,835,712 A | 11/1998 | DuFresne |
| 5,835,724 A | 11/1998 | Smith |
| 5,835,789 A | 11/1998 | Ueda et al. |
| 5,838,563 A | 11/1998 | Dove et al. |
| 5,838,910 A | 11/1998 | Domenikos et al. |
| 5,838,920 A | 11/1998 | Rosborough |
| 5,838,969 A | 11/1998 | Jacklin et al. |
| 5,839,094 A | 11/1998 | French |
| 5,841,360 A | 11/1998 | Binder et al. |
| 5,841,654 A | 11/1998 | Verissimo et al. |
| 5,841,963 A | 11/1998 | Nakamikawa et al. |
| 5,841,991 A | 11/1998 | Russell |
| 5,844,601 A | 12/1998 | McPheely et al. |
| 5,844,796 A | 12/1998 | Araki et al. |
| 5,844,804 A | 12/1998 | Schussler et al. |
| 5,845,078 A | 12/1998 | Tezuka et al. |
| 5,845,230 A | 12/1998 | Lamberson |
| 5,847,957 A | 12/1998 | Cohen et al. |
| 5,848,274 A | 12/1998 | Hamby et al. |
| 5,848,393 A | 12/1998 | Goodridge et al. |
| 5,854,750 A | 12/1998 | Phillips et al. |
| 5,854,944 A | 12/1998 | Catherwood et al. |
| 5,859,966 A | 1/1999 | Hayman et al. |
| 5,862,052 A | 1/1999 | Nixon et al. |
| 5,864,773 A | 1/1999 | Barna et al. |
| 5,867,704 A | 2/1999 | Tanaka et al. |
| 5,872,973 A | 2/1999 | Mitchell et al. |
| 5,872,992 A | 2/1999 | Tietjen et al. |
| 5,873,089 A | 2/1999 | Regache |
| 5,874,990 A | 2/1999 | Kato et al. |
| 5,875,430 A | 2/1999 | Koether |
| 5,876,122 A | 3/1999 | Eryurek |
| 5,878,415 A | 3/1999 | Olds |
| 5,880,775 A | 3/1999 | Ross |
| 5,884,014 A * | 3/1999 | Huttenlocher et al. ...... 358/1.15 |
| 5,903,455 A | 5/1999 | Sharpe, Jr. et al. |
| 5,903,894 A | 5/1999 | Reneris |
| 5,905,248 A | 5/1999 | Russell et al. |
| 5,905,963 A | 5/1999 | Lysejko et al. |
| 5,907,675 A | 5/1999 | Aahlad |
| 5,909,368 A | 6/1999 | Nixon et al. |
| 5,909,586 A | 6/1999 | Anderson |
| 5,917,822 A | 6/1999 | Lyles et al. |
| 5,917,840 A | 6/1999 | Cheney et al. |
| 5,919,247 A | 7/1999 | Van Hoff et al. |
| 5,920,479 A | 7/1999 | Sojoodi et al. |
| 5,922,050 A | 7/1999 | Madany |
| 5,927,398 A | 7/1999 | Maciulewicz |
| 5,928,345 A | 7/1999 | Tetzlaff et al. |
| 5,930,768 A | 7/1999 | Hooban |
| 5,935,242 A | 8/1999 | Madany et al. |
| 5,935,249 A | 8/1999 | Stern et al. |
| 5,940,294 A | 8/1999 | Dove |
| 5,940,839 A | 8/1999 | Chen et al. |
| 5,946,487 A | 8/1999 | Dangelo |
| 5,950,172 A | 9/1999 | Klingman |
| 5,956,484 A | 9/1999 | Rosenberg et al. |
| 5,956,487 A | 9/1999 | Venkatraman et al. |
| 5,956,716 A | 9/1999 | Kenner et al. |
| 5,959,487 A | 9/1999 | Kawamura |
| 5,960,205 A | 9/1999 | Mao et al. |
| 5,960,214 A | 9/1999 | Sharpe, Jr. et al. |
| 5,966,304 A | 10/1999 | Cook et al. |
| 5,969,967 A | 10/1999 | Aahlad et al. |

| | | | |
|---|---|---|---|
| 5,970,430 A | 10/1999 | Burns et al. | |
| 5,974,497 A | 10/1999 | Teshome | |
| 5,975,737 A | 11/1999 | Crater et al. | |
| 5,978,578 A | 11/1999 | Azarya et al. | |
| 5,978,933 A | 11/1999 | Wyld et al. | |
| 5,980,078 A | 11/1999 | Krivoshein et al. | |
| 5,980,090 A | 11/1999 | Royal, Jr. et al. | |
| 5,982,362 A | 11/1999 | Crater et al. | |
| 5,982,762 A | 11/1999 | Anzai et al. | |
| 5,988,852 A | 11/1999 | Nakanishi et al. | |
| 5,991,795 A | 11/1999 | Howard et al. | |
| 5,994,998 A | 11/1999 | Fisher et al. | |
| 5,995,916 A | 11/1999 | Nixon et al. | |
| 6,002,104 A | 12/1999 | Hsu | |
| 6,006,164 A | 12/1999 | McCarty et al. | |
| 6,006,171 A | 12/1999 | Vines et al. | |
| 6,008,985 A | 12/1999 | Lake et al. | |
| 6,009,103 A | 12/1999 | Woundy | |
| 6,014,591 A | 1/2000 | Ikeda | |
| 6,014,612 A | 1/2000 | Larson et al. | |
| 6,016,515 A | 1/2000 | Shaw et al. | |
| 6,018,627 A | 1/2000 | Iyengar et al. | |
| 6,018,816 A | 1/2000 | Tateyama | |
| 6,026,336 A | 2/2000 | Sakurai et al. | |
| 6,026,352 A | 2/2000 | Burns et al. | |
| 6,032,151 A | 2/2000 | Arnold et al. | |
| 6,032,208 A | 2/2000 | Nixon et al. | |
| H1845 H | 3/2000 | Kelly | |
| 6,033,257 A | 3/2000 | Lake et al. | |
| 6,035,264 A | 3/2000 | Donaldson et al. | |
| 6,038,271 A | 3/2000 | Olaker et al. | |
| 6,038,486 A | 3/2000 | Saitoh et al. | |
| 6,044,305 A | 3/2000 | Larson et al. | |
| 6,047,222 A | 4/2000 | Burns et al. | |
| 6,049,578 A | 4/2000 | Senechal et al. | |
| 6,049,775 A | 4/2000 | Gertner et al. | |
| 6,052,629 A | 4/2000 | Leatherman et al. | |
| 6,055,633 A | 4/2000 | Schrier et al. | |
| 6,061,603 A | 5/2000 | Papadopoulos et al. | |
| 6,070,186 A | 5/2000 | Nishio et al. | |
| 6,070,250 A | 5/2000 | Yeager et al. | |
| 6,073,109 A | 6/2000 | Flores et al. | |
| 6,075,863 A | 6/2000 | Krishnan et al. | |
| 6,076,124 A | 6/2000 | Korowitz et al. | |
| 6,078,320 A | 6/2000 | Dove et al. | |
| 6,078,848 A | 6/2000 | Bernstein et al. | |
| 6,080,207 A | 6/2000 | Kroening et al. | |
| 6,085,120 A | 7/2000 | Schwerdtfeger et al. | |
| 6,088,665 A | 7/2000 | Burns et al. | |
| 6,094,600 A | 7/2000 | Sharpe, Jr. et al. | |
| 6,094,655 A | 7/2000 | Rogers et al. | |
| 6,095,674 A | 8/2000 | Verissimo et al. | |
| 6,097,761 A | 8/2000 | Buhring et al. | |
| 6,098,116 A | 8/2000 | Nixon et al. | |
| 6,104,875 A | 8/2000 | Gallagher et al. | |
| 6,105,132 A | 8/2000 | Fritch et al. | |
| 6,108,662 A | 8/2000 | Hoskins et al. | |
| 6,112,020 A | 8/2000 | Wright | |
| 6,112,246 A | 8/2000 | Horbal et al. | |
| 6,115,468 A | 9/2000 | De Nicolo | |
| 6,115,744 A | 9/2000 | Robins et al. | |
| 6,129,449 A | 10/2000 | McCain et al. | |
| 6,129,724 A | 10/2000 | Fleischman et al. | |
| 6,131,067 A | 10/2000 | Girerd et al. | |
| 6,134,559 A | 10/2000 | Brumme et al. | |
| 6,138,140 A | 10/2000 | Yokote | |
| 6,138,174 A | 10/2000 | Keeley | |
| 6,139,177 A | 10/2000 | Venkatraman et al. | |
| 6,140,911 A | 10/2000 | Fisher et al. | |
| 6,141,794 A | 10/2000 | Dice et al. | |
| 6,148,346 A | 11/2000 | Hanson | |
| 6,148,391 A | 11/2000 | Petrick | |
| 6,151,625 A | 11/2000 | Swales et al. | |
| 6,154,875 A | 11/2000 | Tanaka et al. | |
| 6,157,864 A | 12/2000 | Schwenke et al. | |
| 6,160,484 A | 12/2000 | Spahl et al. | |
| 6,167,253 A | 12/2000 | Farris et al. | |
| 6,167,464 A | 12/2000 | Kretschmann | |
| 6,170,007 B1 | 1/2001 | Venkatraman et al. | |
| 6,173,414 B1 | 1/2001 | Zumkehr et al. |
| 6,175,556 B1 | 1/2001 | Allen, Jr. et al. |
| 6,176,421 B1 | 1/2001 | Royal, Jr. et al. |
| 6,183,289 B1 | 2/2001 | Lake et al. |
| 6,185,611 B1 | 2/2001 | Waldo et al. |
| 6,192,281 B1 | 2/2001 | Brown et al. |
| 6,195,591 B1 | 2/2001 | Nixon et al. |
| 6,195,694 B1 | 2/2001 | Chen et al. |
| 6,195,774 B1 | 2/2001 | Jacobson |
| 6,199,068 B1 | 3/2001 | Carpenter |
| 6,199,195 B1 | 3/2001 | Goodwin et al. |
| 6,201,996 B1 | 3/2001 | Crater et al. |
| 6,212,440 B1 | 4/2001 | Suzuki et al. |
| 6,212,575 B1 | 4/2001 | Cleron et al. |
| 6,212,608 B1 | 4/2001 | Bak |
| 6,216,158 B1 | 4/2001 | Luo et al. |
| 6,218,930 B1 | 4/2001 | Katzenberg et al. |
| 6,219,708 B1 | 4/2001 | Martenson |
| 6,236,909 B1 | 5/2001 | Colson et al. |
| 6,246,748 B1 | 6/2001 | Yano |
| 6,260,187 B1 | 7/2001 | Cirne |
| 6,263,487 B1 | 7/2001 | Stripf et al. |
| 6,266,716 B1 | 7/2001 | Wilson et al. |
| 6,266,724 B1 | 7/2001 | Harari et al. |
| 6,268,789 B1 | 7/2001 | Diamant et al. |
| 6,269,473 B1 | 7/2001 | Freed et al. |
| 6,272,529 B1 | 8/2001 | Lum |
| 6,272,556 B1 | 8/2001 | Gish |
| 6,282,454 B1 | 8/2001 | Papadopoulos et al. |
| 6,282,455 B1 | 8/2001 | Engdahl |
| 6,285,966 B1 | 9/2001 | Brown et al. |
| 6,289,299 B1 | 9/2001 | Daniel, Jr. et al. |
| 6,295,356 B1 | 9/2001 | De Nicolo |
| 6,295,513 B1 | 9/2001 | Thackston |
| 6,298,377 B1 | 10/2001 | Hartikainen et al. |
| 6,308,317 B1 | 10/2001 | Wilkinson et al. |
| 6,311,101 B1 | 10/2001 | Kastner et al. |
| 6,314,448 B1 | 11/2001 | Conner et al. |
| 6,314,464 B1 | 11/2001 | Murata et al. |
| 6,317,701 B1 | 11/2001 | Pyotsia et al. |
| 6,324,607 B1 | 11/2001 | Korowitz et al. |
| 6,327,511 B1 | 12/2001 | Naismith et al. |
| 6,332,163 B1 | 12/2001 | Bowman-Amuah |
| 6,334,161 B1 | 12/2001 | Suzuki et al. |
| 6,336,142 B1 | 1/2002 | Kato et al. |
| 6,345,295 B1 | 2/2002 | Beardsley et al. |
| 6,345,382 B1 | 2/2002 | Hughes |
| 6,348,874 B1 | 2/2002 | Cole et al. |
| 6,349,287 B1 | 2/2002 | Hayashi |
| 6,353,859 B1 | 3/2002 | McKeehan et al. |
| 6,353,860 B1 | 3/2002 | Hare et al. |
| 6,360,091 B1 | 3/2002 | Schellinger et al. |
| 6,366,300 B1 | 4/2002 | Ohara et al. |
| 6,370,448 B1 | 4/2002 | Eryurek |
| 6,370,573 B1 | 4/2002 | Bowman-Amuah |
| 6,373,841 B1 | 4/2002 | Goh et al. |
| 6,377,543 B1 | 4/2002 | Grover et al. |
| 6,377,859 B1 | 4/2002 | Brown et al. |
| 6,382,226 B1 | 5/2002 | Larson et al. |
| 6,393,050 B1 | 5/2002 | Liu |
| 6,405,099 B1 | 6/2002 | Nagai et al. |
| 6,405,210 B1 | 6/2002 | Doyle et al. |
| 6,412,070 B1 | 6/2002 | Van Dyke et al. |
| 6,418,499 B1 | 7/2002 | Korowitz et al. |
| 6,424,883 B1 | 7/2002 | Hosokawa et al. |
| 6,430,564 B1 | 8/2002 | Judge et al. |
| 6,434,594 B1 | 8/2002 | Wesemann |
| 6,438,182 B1 | 8/2002 | Olaker et al. |
| 6,442,442 B1 | 8/2002 | Weinhofer |
| 6,445,962 B1 | 9/2002 | Blevins et al. |
| 6,449,624 B1 | 9/2002 | Hammack et al. |
| 6,449,715 B1 | 9/2002 | Krivoshein |
| 6,480,903 B1 | 11/2002 | Voutaz et al. |
| 6,480,955 B1 | 11/2002 | DeKoning et al. |
| 6,487,214 B1 | 11/2002 | Bachar |
| 6,487,558 B1 | 11/2002 | Hitchcock |
| 6,493,405 B1 | 12/2002 | Olaker et al. |
| 6,496,892 B1 | 12/2002 | Lake et al. |
| 6,499,048 B1 | 12/2002 | Williams |

| | | | | | | |
|---|---|---|---|---|---|---|
| 6,501,995 B1 | 12/2002 | Kinney et al. | 7,882,197 B2 | 2/2011 | Thibault et al. | |
| 6,510,352 B1 | 1/2003 | Badavas et al. | 7,890,927 B2 | 2/2011 | Eldridge et al. | |
| 6,526,455 B1 | 2/2003 | Kamimura | 7,899,070 B2 | 3/2011 | Thibault et al. | |
| 6,526,516 B1 | 2/2003 | Ishikawa et al. | 2001/0007133 A1 | 7/2001 | Moriconi et al. | |
| 6,532,531 B1 | 3/2003 | O'Connor et al. | 2001/0007183 A1 | 7/2001 | Weder | |
| 6,557,056 B1 | 4/2003 | Lanteigne et al. | 2001/0025307 A1 | 9/2001 | Venkatraman et al. | |
| 6,563,420 B2 | 5/2003 | Brown et al. | 2001/0034777 A1 | 10/2001 | Venkatraman et al. | |
| 6,574,515 B1 | 6/2003 | Kirkpatrick et al. | 2001/0034778 A1 | 10/2001 | Venkatraman et al. | |
| 6,574,694 B1 | 6/2003 | Chen et al. | 2001/0034779 A1 | 10/2001 | Venkatraman et al. | |
| 6,594,692 B1 | 7/2003 | Reisman | 2001/0034780 A1 | 10/2001 | Venkatraman et al. | |
| 6,598,224 B1 | 7/2003 | Maeda et al. | 2001/0034781 A1 | 10/2001 | Venkatraman et al. | |
| 6,612,022 B1 | 9/2003 | Gale et al. | 2001/0037489 A1 | 11/2001 | Stripf et al. | |
| 6,618,754 B1 | 9/2003 | Gosling | 2001/0044836 A1 | 11/2001 | Venkatraman et al. | |
| 6,622,147 B1 | 9/2003 | Smiga et al. | 2001/0052109 A1 | 12/2001 | Nagashima et al. | |
| 6,636,900 B2 | 10/2003 | Abdelnur | 2002/0013629 A1 | 1/2002 | Nixon et al. | |
| 6,640,308 B1 | 10/2003 | Keyghobad et al. | 2002/0049865 A1 | 4/2002 | Charnell et al. | |
| 6,647,495 B1 | 11/2003 | Takeuchi et al. | 2002/0067370 A1 | 6/2002 | Forney et al. | |
| 6,654,353 B1 | 11/2003 | Tokura et al. | 2002/0093980 A1 | 7/2002 | Trebes | |
| 6,671,763 B1 | 12/2003 | Korowitz et al. | 2002/0133636 A1 | 9/2002 | Venkatraman et al. | |
| 6,675,193 B1 | 1/2004 | Slavin et al. | 2002/0150156 A1 | 10/2002 | Calvin | |
| 6,687,698 B1 | 2/2004 | Nixon et al. | 2002/0165848 A1 | 11/2002 | Rautenbach et al. | |
| 6,700,869 B1 | 3/2004 | Falco et al. | 2002/0194393 A1 | 12/2002 | Hrischuk et al. | |
| 6,701,284 B1 | 3/2004 | Huntley et al. | 2002/0198920 A1 | 12/2002 | Resnick et al. | |
| 6,718,215 B2 | 4/2004 | Friedrich et al. | 2003/0009250 A1 | 1/2003 | Resnick et al. | |
| 6,718,533 B1 | 4/2004 | Schneider et al. | 2003/0051068 A1 | 3/2003 | Eldridge | |
| 6,738,388 B1 | 5/2004 | Stevenson et al. | 2003/0115238 A1 | 6/2003 | O'Connor et al. | |
| 6,754,885 B1 | 6/2004 | Dardinski et al. | 2003/0167269 A1 | 9/2003 | Gupta | |
| 6,760,687 B2 | 7/2004 | Apel et al. | 2003/0200351 A1 | 10/2003 | O'Connor et al. | |
| 6,763,370 B1 | 7/2004 | Schmeidler et al. | 2003/0200369 A1 | 10/2003 | Musumeci | |
| 6,775,707 B1 | 8/2004 | Bennett et al. | 2003/0208558 A1 | 11/2003 | Venkatraman et al. | |
| 6,788,980 B1 | 9/2004 | Johnson | 2004/0103165 A1 | 5/2004 | Nixon et al. | |
| 6,792,321 B2 | 9/2004 | Sepe, Jr. | 2004/0117534 A1 | 6/2004 | Parry et al. | |
| 6,799,148 B2 | 9/2004 | Ling et al. | 2005/0138226 A1 | 6/2005 | Tateyama et al. | |
| 6,799,185 B1 | 9/2004 | Wallman et al. | 2005/0149893 A1 | 7/2005 | Roesner et al. | |
| 6,799,195 B1 | 9/2004 | Thibault et al. | 2005/0160263 A1 | 7/2005 | Naizhen et al. | |
| 6,806,847 B2 | 10/2004 | Nixon et al. | 2005/0172258 A1 | 8/2005 | Nixon et al. | |
| 6,807,558 B1 | 10/2004 | Hassett et al. | 2005/0283730 A1 | 12/2005 | Uyttendaele et al. | |
| 6,826,590 B1 | 11/2004 | Glanzer et al. | 2006/0129724 A1 | 6/2006 | Kostadinov | |
| 6,832,223 B1 | 12/2004 | Scheifler et al. | 2006/0206860 A1 | 9/2006 | Dardinski et al. | |
| 6,850,973 B1 | 2/2005 | Larson et al. | 2006/0206866 A1 | 9/2006 | Eldrige et al. | |
| 6,853,867 B1 | 2/2005 | Klindt et al. | 2006/0212146 A1 | 9/2006 | Johnson et al. | |
| 6,868,538 B1 | 3/2005 | Nixon et al. | 2007/0006149 A1 | 1/2007 | Resnick et al. | |
| 6,874,082 B2 | 3/2005 | Tateyama et al. | 2007/0019560 A1 | 1/2007 | Brewer et al. | |
| 6,888,541 B2 | 5/2005 | Morse | 2007/0061786 A1 | 3/2007 | Zhou et al. | |
| 6,895,409 B2 | 5/2005 | Uluakar et al. | 2007/0083552 A1 | 4/2007 | Allen et al. | |
| 6,928,396 B2 | 8/2005 | Thackston | 2007/0110835 A1 | 5/2007 | Maes et al. | |
| 6,959,356 B2 | 10/2005 | Packwood et al. | 2007/0118805 A1 | 5/2007 | Kraus et al. | |
| 6,978,194 B2 | 12/2005 | McIlhany et al. | 2007/0244571 A1 | 10/2007 | Wilson et al. | |
| 6,983,227 B1 | 1/2006 | Thalhammer-Reyero | 2007/0265089 A1 | 11/2007 | Robarts et al. | |
| 7,020,532 B2 | 3/2006 | Johnson et al. | 2008/0040477 A1 | 2/2008 | Johnson et al. | |
| 7,024,282 B2 | 4/2006 | Coogan et al. | 2008/0046598 A1 | 2/2008 | Johnson et al. | |
| 7,032,045 B2 | 4/2006 | Kostadinov | 2008/0052386 A1 | 2/2008 | Johnson et al. | |
| 7,054,793 B2 | 5/2006 | Moritz et al. | 2008/0119951 A1 | 5/2008 | Thibault et al. | |
| 7,080,366 B2 | 7/2006 | Kramskoy et al. | 2008/0120367 A1 * | 5/2008 | Thibault et al. | 709/203 |
| 7,086,009 B2 | 8/2006 | Resnick et al. | 2008/0126500 A1 * | 5/2008 | Thibault et al. | 709/208 |
| 7,089,530 B1 | 8/2006 | Dardinski et al. | 2008/0133700 A1 * | 6/2008 | Thibault et al. | 709/217 |
| 7,096,465 B1 | 8/2006 | Dardinski et al. | 2008/0134215 A1 | 6/2008 | Thibault et al. | |
| 7,110,835 B2 | 9/2006 | Blevins et al. | 2008/0148170 A1 * | 6/2008 | Thibault et al. | 715/772 |
| 7,123,974 B1 | 10/2006 | Hamilton | 2008/0216169 A1 | 9/2008 | Naizhen et al. | |
| 7,142,322 B2 | 11/2006 | Lee | 2008/0222276 A1 | 9/2008 | Thibault et al. | |
| 7,146,231 B2 | 12/2006 | Schleiss et al. | 2009/0094326 A1 | 4/2009 | Thibault et al. | |
| 7,146,408 B1 | 12/2006 | Crater et al. | 2009/0118845 A1 | 5/2009 | Eldridge et al. | |
| 7,151,966 B1 | 12/2006 | Baier et al. | 2009/0118846 A1 | 5/2009 | Eldridge et al. | |
| 7,158,513 B2 | 1/2007 | Wada et al. | 2009/0125128 A1 | 5/2009 | Eldridge et al. | |
| 7,162,510 B2 | 1/2007 | Jammes | 2009/0125129 A1 | 5/2009 | Eldridge et al. | |
| 7,177,052 B2 | 2/2007 | Lapstun et al. | 2009/0125130 A1 | 5/2009 | Eldridge et al. | |
| 7,199,784 B2 | 4/2007 | Mathiowetz et al. | 2009/0125131 A1 | 5/2009 | Eldridge et al. | |
| 7,245,271 B2 | 7/2007 | Nixon et al. | 2009/0132996 A1 | 5/2009 | Eldridge et al. | |
| 7,249,330 B2 | 7/2007 | Roesner et al. | 2009/0164031 A1 | 6/2009 | Johnson et al. | |
| 7,272,815 B1 | 9/2007 | Eldridge et al. | 2009/0241086 A1 | 9/2009 | Saito et al. | |
| 7,275,062 B2 | 9/2007 | Deitz et al. | 2009/0259751 A1 | 10/2009 | Thibault et al. | |
| 7,337,256 B2 | 2/2008 | Korowitz et al. | 2009/0319058 A1 | 12/2009 | Rovaglio et al. | |
| 7,356,588 B2 | 4/2008 | Stineman, Jr. et al. | 2010/0005425 A1 | 1/2010 | Kodosky et al. | |
| 7,502,656 B2 | 3/2009 | Thibault et al. | 2010/0011127 A1 | 1/2010 | Johnson et al. | |
| 7,574,693 B1 | 8/2009 | Kemink | 2010/0011311 A1 | 1/2010 | Kodosky et al. | |
| 7,610,354 B2 | 10/2009 | Adams et al. | 2010/0076604 A1 | 3/2010 | Johnson et al. | |
| 7,664,574 B2 | 2/2010 | Imhof et al. | 2010/0121999 A1 | 5/2010 | Isenmann et al. | |
| 7,720,944 B2 * | 5/2010 | Thibault et al. ............ 709/222 | 2010/0131084 A1 | 5/2010 | Van Camp | |
| 7,739,361 B2 * | 6/2010 | Thibault et al. ............ 709/222 | 2010/0222902 A1 | 9/2010 | Eldridge et al. | |

| | | | |
|---|---|---|---|
| 2010/0223593 | A1 | 9/2010 | Eldridge et al. |
| 2010/0305720 | A1 | 12/2010 | Doll et al. |
| 2010/0305721 | A1 | 12/2010 | Kostadinov et al. |
| 2011/0040390 | A1 | 2/2011 | Blevins et al. |
| 2011/0093098 | A1 | 4/2011 | Kostadinov et al. |

FOREIGN PATENT DOCUMENTS

| | | |
|---|---|---|
| EP | 0640905 | 3/1995 |
| EP | 0660231 | 6/1995 |
| EP | 0906595 | 4/1999 |
| EP | 1006691 | 6/2000 |
| JP | 02159526 A | 6/1990 |
| JP | 09033647 A | 2/1997 |
| JP | 10019655 A | 1/1998 |
| JP | 11143511 A | 5/1999 |
| WO | WO-9114324 | 9/1991 |
| WO | WO-9504314 A1 | 2/1995 |
| WO | WO-9623377 A1 | 8/1996 |
| WO | WO-9631047 | 10/1996 |
| WO | WO-9707486 | 2/1997 |
| WO | WO-9726587 | 7/1997 |
| WO | WO-9820649 A1 | 5/1998 |
| WO | WO-9829804 | 7/1998 |
| WO | WO-9836518 A2 | 8/1998 |
| WO | WO-9854843 A1 | 12/1998 |
| WO | WO-0077592 A2 | 12/2000 |
| WO | WO-03039098 A2 | 5/2003 |

OTHER PUBLICATIONS

Foxboro, "I/A Series A2™ Software-FoxCTS-Change Tracking Software-Product Specifications," 1997-2003, pp. 1-8.
Foxboro, "I/A Series Software-FoxCTS™—Change Tracking Software-Product Specifications," 1997-2006, pp. 1-12.
I/A Series, "Object Manager Calls—Oct. 31, 1995," Foxboro, pp. 1-124.
IRD Mechanalysis, Inc., "Model 816 Machinery Maintenance Data Collector," 1983, 2 pages.
IRD Mechanalysis, Inc., "Model 817 Machinery Maintenance Data Collector," 1984, 4 pages.
IRD Mechanalysis, Inc., "Model 817 Machinery Maintenance Data Collector," 1985, 6 pages.
Maser, K. et al., "Development of a Wireless Global Bridge Evaluation and Monitoring System (WGBEMS)," Building of International Community of Structural Engineers, vol. 2, Proceedings of Structures Congress XIV Apr. 15-18, 1986, American Society of Civil Engineers, Chicago IL, 8 pages.
Niagara Framework, http://www.tridium.com/products/niagara.asp, Feb. 10, 2005, 2 pages.
Stein, R. et al. "Development of a Commercially Successful Wearable Data Collection System," University of CA San Diego, Downloaded Jan. 12, 2009, 7 pages.
U.S. Appl. No. 09/721,409, filed Nov. 21, 2000, Venkatraman et al.
Office Action mailed Feb. 1, 2008, U.S. Appl. No. 10/765,006.
Office Action mailed Jul. 2, 2007, U.S. Appl. No. 10/765,006.
Office Action mailed Sep. 24, 2003, U.S. Appl. No. 09/379,074.
Office Action mailed Dec. 26, 2002, U.S. Appl. No. 09/379,074.
Office Action mailed Apr. 23, 2002, U.S. Appl. No. 09/379,074.
Mark R. Brown, Using Netscape 2, 1995.*.
Gaines, B.R. et al. "Mediator: an Intelligent Information System Supporting the Virtual Manufacturing Enterprise," IEEE .RTM. 1995 (XP 000586326) pp. 964-969.
Goldammer, G. "HTML-script calls Java-applet . . . a new development technique under a software- and applications-technology configuration," IM Information Management vol. 11, No. 3 (Aug. 2, 1996) pp. 6-14, IDG Communications Verlag, Germany(abstract).
"Agenda," ISA/SP50—1988-180, ISA Draft.
Application of PRIAM Model to Safety Systems on Offshore Oil/Gas Platforms. Silvertech Ltd., Jan. 9, 1995.
"Automation System Monitors, Controls Fab HVAC, Other Systems," Microcontamination (Aug. 1994).
Batch Control. Part I: Models and Terminology. (Approved Feb. 28, 1995) ISA-S88.01 1995.
Benkhallat, Yazid, et al. "Interoperability of sensors and distributed systems," Sensors and Actuators A vol. 37-38 (1993), 247-254.
Blevins, Terry. "Characteristics of Function Block Requirements for the Process Industry and Manufacturing Automation," Fisher-Rosemount, Oct. 31, 1995.
Brunn, P. "Collision Avoidance for Two Robots Sharing a Common Workspace," (1995) The Institution of Electrical Engineers.
Burton, P. I. "A personal history of batch control," Measurement + Control vol. 27 (Apr. 1994), pp. 69-73.
Burton, P. I., et al. "Field Bus Based on MIL-StD-1553B: Proposal to ISA-SP-50" ERA Technology Ltd. (Apr. 6, 1988) ISA/SP50-1988-148.
Capetta, L., et al. "From Current Actuators and Transmitters Towards Intelligent Actuation and Measurement: PRIAM Approach," BIAS 93.
Caro, Richard H. "Field Bus Applications," ISA (1989) Paper #89/0569, pp. 989-994.
"Tribe Computer Works' Net Products Can be Managed via World Wide Web," IAC (SM) Newsletter Database.TM., Data Trends Publications, Inc., No. 11, vol. 7, May 30, 1995.
"Briefs," Network World, May 29, 1995, p. 19.
Wilder, Clinton, "Network Management; Russing Nets Via the Web—Tribe's WebManage uses popular interface," InformationWeek, May 29, 1995, p. 62.
"Pipeline; Announced," InfoWorld, May 29, 1995, p. 45.
Bernard, Viki, "Remote-access ware emerge; Shiva, Nortel and Tribe leading list of innovators,"PCWeek, No. 21, vol. 12, May 29, 1995, p. 47.
"Tribe Announces Revolutionary Use of the Internet; Launches Innovative Remote Management Solution; New WebManage Technology Provides Network Management via World Wide Web," Business Wire, May 22, 1995.
"Tribe Launches First Networking Device Capable of Being Managed via Internet Web Browser; TribeLink2 Enables Remote Computing and Internet Access," Business Wire, May 22, 1995.
Dryden, Patrick, "Tribes WebManage Enables Remote Fixes," ComputerWorld, May 22, 1995, p. 14.
Ko, Diffu, "Trobe defines net management role for Web browser sofware," Network World, May 22, 1995, p. 14.
"Tribe Launches Innovative Remote Management Solution; New WebManage Technology Provides Network Management Via the World Wide Web," web page print-out (Jul. 12, 1999) from http://www.tribe.com/products/webmanage/wm_pr. (1 page).
"TribeRoute," web page print-out (Jul. 12, 1999) from http://www.tribe.com/products/tr/index. (3 pages).
Pappalardo Denise, "Router Can Be Managed via Net," Internet Week, May 22, 1995, p. 6.
Rodriguez, Karen, "Tribe sets software," Interactive Age, vol. 2, No. 15, May 22, 1995, p. 25.
Welch, Nathalie, "Tribe to manage via Web; Tribe Computer Works Inc.'s TribeLink2 Product Announcement," MacWEEK, vol. 9, No. 21, May 22, 1995, p. 18.
Pappalardo, Denise, "Digi Introduces IP/IPX Router," InternetWeek, Apr. 24, 1995, p. 15.
"WWWF'94: Papers Received," web page print-out (Apr. 7, 2000) from http://www.ncsa.uiuc.edu/SDG/IT94/Agenda/Papers-received.html (8 pages).
Elmer-Dewitt, Philip, "Snbowballs in Cyberspace; With a modem and a soldering iron, you too can build an Internet site that is really cool and totally useless," Time, Jan. 16, 1995, p. 57.
Scharf, Ronald, et al, "Using Mosaic for Remote Test System Control Supports Distributed Engineering," Institute of computer-Aided Circuit Design—Test and Testsystems Division, University of Erlangen-Nurnberg, Germany, web page print-out fromhttp://www.ncsa.uiuc.edu/SDG/IT94/Proceedings/CSCW/scharf/scharf.html (8 pages).
Cox, Mark J. and Baruch, Dr. John E. F. "Robotic Telescopes: An Interactive Exhibit on the World-Wide Web," web page print-out from http://www.ncsa.uiuc.edu/SDG/IT94/Proceedings/Museum/cox/markcox.html (11 pages).
Gleick, James. "Fast Forward; Really Remote Control," The New York Times, Section 6, col. 3, p. 42, Dec. 3, 1995.
Silverman, Dwight. "Attaboy for the best software and hardware of 1994," The Houston Chronicle, Dec. 25, 1994, p. 2.
Browne, Malcolme W. "South Pole Ready for Internet Revolution," The New York Times, Section C, col. 1, p. 1, Jan. 10, 1995.

Wolfe, Alexander, "Strong Brew," Electronic Engineering Times, Apr. 8, 1996, p. 73.
Momal, F. and Pinto-Pereira, C. "Using World-Wide-Web for Control Systems," from Proceedings 1995 International Conference on Accelerator and Large Experimental Physics Control Systems, Chicago, IL, Oct. 30-Nov. 3, 1995.
"The 'Only' Coke Machine on the Internet," web page print-out (Feb. 12, 1999) from http://www.cs.cmu.edu/.about.coke/history_long.txt (3 pages).
"CMU SCS Coke Machine: Current Status," web page print-out (Feb. 12, 1999) from http://www.cs.cmu.edu/.about.coke/ (1 page).
"The Switzerland Coke Machine Credits," web page print-out (Feb. 12, 1999) from http://www-swiss.ait.mit.edu/htbin/coke/ (1 page).
"Peter Beebee's Home Page" web page print-out (Feb. 12, 1999) from http://www-swiss.ai.mit.edu/htbin/ptbbgate/jwz/?fetch+personal%2Fmain.text.html (2 pages).
"bsy's List of Internet Accessible Coke Machines," web page print-out (Feb. 12, 1999) from http://www-cse.ucsd.edu/users/bsy/coke.html (1 page).
"Disk Drive with Embedded Hyper-Text Markup Language Server," IBM TDB, vol. 38, n. 12, Dec. 1995, pp. 479-480.
Leon, Mark, "Tektronix to add Web software on new printers," InfoWorld, Dec. 4, 1995, p. 6.
"I/A Series Model 51 FoxRemote II Installation and Configuration Guide," Apr. 8, 1998 (Preliminary), pp. i-iv, 1-2.
"New State-Logic Microcontroller," News Release, Control Technology Corp., Jun. 1, 1996, (Dialog Web Search Result).
"New at IPC/92! Ethernet link provides Global PLC Registers," News Release, Control Technology (US), Nov. 20, 1992, (Dialog Web search result).
"New at IPC/92' High-Capacity Integrated Motion Controller," News Release, Control Technology (US) Nov. 20, 1992, (DialogWeb search result).
"Dual-Axis Servo Module for Small Controller," News Release, Control Technology (US), Sep. 11, 1990, (DialogWeb search result).
"Innovative Small Controller Family offers Full Integration," News Release, Control Technology, Aug. 17, 1989, (Dialog Web search result).
AC I/O Modules Available for Low-Cost Automation Controller, News Release, Control Technology Corporation, Jun. 28, 1989, (Dialog Web search result).
"New Small Automation Controller feautres Precision Analog I/O Modules," News Release, Control Technology (US), May 30, 1989, (Dialog Web search result).
"Inexpensive Automation Controller features Message Display Capability," News Release, Control Technology (US), May 19, 1989, (DialogWeb search result).
."Small Multi-Tasking Controller for Cost-sensitive Applications," News Release, Control Technology US, Nov. 8, 1988, (Dialog Web search result).
"CAD/CAM Software creates Automation Programming Environment," News Release, Control Technology (US), Oct. 3, 1988, (Dialog Web search result).
"Automation Programming Environment runs on IBM (R)-PC," News Release, Control Technology (US), Mar. 29, 1988, (Dialog Web search result).
"Low-Cost Automation Controller features Motion Control, Communications," News Release, Control Ecology (US), Mar. 7, 1988, (Dialog Web search result).
"System Provides Stepping Motor Cotnrol in Workcell Environment," News Release, Control Technology Corp., Dec. 5, 1986, (Dialog Web search result).
"Multi-Tasking Controller provides High-level Instructions for Motion Control, Sequencing," News Release, Control Technology Corporation, Aug. 22, 1986, (Dialog Web search result).
"Operator's console creates 'Friendly' Machines," News Release, Control Technology (US), May 19, 1986, (DialogWeb search result).
"Automation Controller features fast 81086 Processor, Integrated Software," News Release, Control Technology (US), Apr. 22, 1986, (Dialog Web search result).
"Plug-Compatible Controls and Actuators Speed System Development," News Release, Control Technology (US), Jan. 13, 1986, (DialogWeb search result).

"Modular Valve Assemblies Connect to Controller with Ribbon Cable," New Product Release, Control Technology (US), Jan. 8, 1986, (DialogWeb search result).
"Linear Actuators offer Plug-Compatibility with Controller," News Release, Control Technology (US), Nov. 21, 1985 (DialogWeb search result).
"Compact System Combines Motion Control, Machine Control," News Release, Control Technology, May 28, 1985, (Dialog Web search result).
"Automation Controller accepts Customization," News Release, Control Technology Jul. 12, 1985, (Dialog Web search result).
"SECS-11 Communication Board Plugs into Automation Controller," News Release, Control Technology, Aug. 26, 1985, (Dialog Web search result).
"Operator's Console for Automated Machines," News Release, Control Technology, Aug. 15, 1985, (Dialog Web search result).
"Programmable Controller offers control of Stepping and Servo Motors," News Release, Control Technology, May 31, 1985, (DialogWeb search result).
"On-Line Vending Machine and Catalog Product Icons," IBM TDB, v. 38, n. 4 (Apr. 1995), pp. 113-116.
Tinham, Brian, "Getting SCADA by web browsner? Supervisory Control and Data Acquisition," Control and Instrumentation, No. 12, vol. 28, Dec. 1996, p. 5.
"Wizards wheel over SCADA systems; Supervisory Control and Data Acquisition," Control and Instrumentation, No. 12, vol. 28, Dec. 1996, p. 23.
Fulcher, Jim and Dilger, Karen Abramic, "Soft control, Internet spark ISA/96," Manufacturing Systems, vol. 14, No. 12, Dec. 1996, pp. 40-46.
"Information technology in manufacturing," Manufacturing Systems, vol. 14, No. 12, Dec. 1996, pp. 54-78.
"A sensation in supervisory control," Manufacturing Systems (Windows NT in manufacturing Supplement), Oct. 1996, pp. 12A-24A.
Demetratekes, Pam. "Go with the info flow; state-of-the-art automation in the food industry; includes related article on computer software for food processors," Food Processing, vol. 57, No. 7, Jul. 1996, p. 47.
"New Products Provide Interactive Graphics Over Web Using Netscape Plug-Ins and Java," PR Newswire, May 20, 1996.
"Integrated Systems; Industry's top embedded operating software supports Java," M2 Presswire, Mar. 4, 1996.
"ErgoTech upgrades ErgoCim; first plug and play component software for manufacturing," Business Wire, Feb. 15, 1996.
"Embedded Systems Conference Addresses the Increasing Complexity of Electronic Systems Design; Technical Program and Exhibits Help Embedded Systems Design Professionals Keep Pace with Rapid Change," PR Newswire, Dec. 27, 1995.
"Industry's top embedded operating software supports Java; pSOSystem enables Embedded Internet applications and Low-cost Internet appliances," Business Wire, Feb. 1, 1996.
"Gensym introduces G2 WebMiner for accessing and reasoning about data from the World Wide Web," Business Wire, May 15, 1996.
"Gensym introduces Internet connectivity for its G2 family of intelligent real-time software," Business Wire, Mar. 18, 1996.
"Gensym Announces Its Initiative for Leveraging Intelligent Systems with Internet/Intranet Technology," Business Wire, Oct. 7, 1997.
"At Interop, Will ToasterNet Be on the Hot List?" Data Communications, vol. 19, No. 13, Oct. 1990, p. 214.
Zeff, Joe. "Maui Sunset in Real Time (Modems not Optional)," The New York Times, Nov. 27, 1995, Section D, col. 2, p. 5.
Toner, Mike. "Web's view of world far and wide," The Houston Chronicle, Nov. 5, 1995, p. 6.
"Internet windows to the world," New Media Age, Oct. 26, 1995, p. 4.
Foster, Kirsten. "surfs up; lights, camera, but no action; Steve is a Tech-Nomad. He wanders the streets with a camera on his head. And he wants you to join him," The Independent (London), Aug. 13, 1995, p. 10.
"Jim Henry's 1996 ASEE Paper," web page print-out from http://chem.engr.utc.edu/Documents/ASEE-96-full.html (5 pages).

Henry, Jim, Ph.D., P.E. "LabVIEW Applications in Engineering Labs: Controls, Chemical, Environmental," ASEE Conference, Anaheim, CA, Jun. 25-28, 1995, web page print-out from http://chem.engr.utc.edu/Documents/ASEE-95-full.html (22 pages).

"Breaking News for Invensys Software Systems Employees; iBaan and FactorySuite 2000 Integration Announced," internal e-mail dated Mar. 23, 2001.

Gertz, Matthew, et al. "A Human-Machine Interface for Distributed Virtual Laboratories," IEEE Robotics & Automation Magazine Dec. 1, 1994, No. 4 (New York) pp. 5-13.

Soreide, N. N., et al. "Mosaic access to real-time data from the TOGA-TAO array of moored buoys," Computer Networks and ISDN Systems 28 (1995), pp. 189-197.

Goldstein, Ira and Hardin, Joseph. "Guest editorial," Computer Networks and ISDN Systems 28 (1995) p. 1.

Slater, A. F. "Controlled by the Web," Computer Networks and ISDN Systems 27 (1994) pp. 289-295.

Goldberg, Ken, et al. "Beyond the Web: manipulating the real world," Computer Networks and ISDN Systems 28 (1995) pp. 209-219.

Goldstein, Ira and Hardin, Joseph, "Guest editorial," Computer Networks and ISDN Systems 28 (1995) p. 1.

"Disk Drive with Embedded Hyper-Text Markup Language Server," IBM TDB, Dec. 1995.

Caro, Richard H. "The Fifth Generation Process Control Architecture," ISA (1988) Paper #88-1487, pp. 659-667.

Caro, Richard H. "The Fifth Generation Process Control Architecutre," ISA Transactions vol. 28 No. 4 (1989), pp. 23-28.

Chettle, Tim. "Multiplexing techniques optimise data collection," Electrotechnology (Oct./Nov. 1995).

Coleman, Vernon. "National Electrical Manufactures Assoication Field Bus Report to ISA SP50," (Oct. 1988) ISA/SP50-1988-234.

Conference Record of the 1993 IEEE Industry Applications Conference, Part III (excerpt).

Contents, Proceedings of the Second International Workshop on Configurable Distrubuted Systems, Mar. 21-23, 1994, Pittsburgh, PA.

Craig, Lynn W. "SP-88 Defines Batch Control," INTECH Mar. 1994, pp. 34-37.

Crowder, R. S.. "Generic Data Link Transactions for Simple Devices," Proposal to ISA SP 50 & IEC/SC65C/WG6 (Oct. 15, 1988) ISA Document.

Crowley-Milling, et al, eds. "Proceedings," 1995 International Conference on Accelerator and Large Experimental Physics Control Systems, Chicago, IL Oct. 30-Nov. 3, 1995, [cover pages].

Delahostria. Communication Model Application Layer. (Oct. 14, 1988) ISA/SP50-1988 247, ISA Draft.

Delfino, B. and Pinceti, P. "Fieldbus Applications for Electrical Industrial Systems," IEEE (1993), pp. 2084-2090.

Dezso, Danyi. "Halozati szabalyozas," Meres es Automatika vol. 37 (1989), pp. 208-213.

Dryden, Patrick. "Tribes webmanage enables remote fixes," Computerworld (May 22, 1995), p. 14.

Editing Committee Draft Application Layer, Version 6, Dec. 1990.
Editing Committee Draft Application Layer, Version 8, May 1991.
Editing Committee Draft Application Layer, Version 12, Oct. 1991.

Esprit Project 6188, "PRIAM Dictionary: Major Terms and Definitions Used in the PRIAM Project," Prenormative Requirements for Intelligent Actuation and Measurement, May 1995.

Esprit Project 8244, "User Requirements for Intelligent Transmitter and Actuators," European Intelligent Actuation and Measurement User Group, Nov. 24, 1995.

Fieldbus Standard for Use in Industrial Control Systems. Part 2: Physical Layer Specification and Service Definition. (1992) ANSI/ISA/550.02.

Foxboro Fieldbus Proposal (Presented to ISA SP-50 Committee Feb. 24, 1988) ISA/SP50-1988-123B, ISA Draft.

Furness, Harry. "Fieldbus: The Differences Start From the Bottom Up," Control Engineering (Mar. 1994), pp. 75-77.

Greene, Tim. "Sahara puts Java to Management Test," Network World vol. 13, No. 7 (Feb. 12, 1996).

Holding, David and Wood, Graham. "Communications in microprocessor industrial implementation," Microprocessors and Microsystems vol. 3 No. 10 (Dec. 1979), pp. 443-451.

Johnson, Dick. "Pressure Sensing Advances: Are They in our Process'Future?" Control Engineering (Apr. 1995), pp. 67-72.

Kelly, D. Mark. "Digital fieldbus cluster cuts plant's wiring costs up to 20%," INTECH (Apr. 1995), pp. 62-64.

Ko, Diffu. "Trobe [sic] defines net management role for Web browser software," Network World (May 22, 1995) p. 14.

Koth, H. and Oeder, K. "The Advantages of Intelligent Field Modules for Nuclear Power Platn Operation and Maintenance," Kerntechnik 60 (1996) 5-6, pp. 215-219.

Lenhart, Gerald W. "A Field Bus Approach to Local Control Networks," ISA, Paper #93-281 (1993).

Lenhart, Gerald W. "Fieldbus-Based Local Control Networks," INTECH (Aug. 1994), p. 31-34.

Loose, Graham. "Fieldbus—the user's perspective," Measurement + Control vol. 27 (Mar. 1994), pp. 47-51.

Meeting Minutes, SP50, International Electrotechnical Commission, Technical Committee No. 65: Industiral-Process Measurement and Control, Sub-Committee 65C: Digital Data Communications for Measurement and Control and Working Group 6: Field BusStandard for Use in Industrial Control Systems, Feb. 28-Mar. 4, 1988, Scottsdale, AZ.

Meeting Minutes, SP50.4. Application Layer, Oct. 19-21, 1988, Houston, TX.

Meeting Minutes, Windows Working Group of Application Subcommittee, Mar. 1-3, 1989, New Orleans, LA.

Meeting Minutes Ad Hoc Function Block Meeting, Jun. 14, 1990, Chapel Hill, NC.

Meeting Minutes, SP50, Signal Compatibility of Electrical Instruments, Dec. 5-7, 1990, Orlando, FL.

Meeting Minutes, Process Control Working Group of SP50.4, Jan. 21-23, 1991, Atlanta, GA.

Meeting Notes, International Electrotechnical Commission Sub Committee No. 65C: Digital Communications Working Group 7, Process Control Function Blocks Report to AMT/7. Apr. 4, 1996.

"Mitsubishi licenses Sun's Java tool," Electronic Engineering Times (Dec. 11, 1995) p. 29.

"NCR Fieldbus Slave Controller Advance Information," ISA-SP50-1988-161, ISA Draft.

NOAH: Network Oriented Application Harmonisation based on General Purpose Field Communication System. Project description rev. 1.0, Oct. 25, 1995. P-NET, PROFIBUS, WorldFIP.

"On-line Vending Machine and Catalog Product Icons," IBM TDB vol. 38, No. 4 (Apr. 1995) pp. 113-116.

Output to Valve, Revision No. 1.4, Jan. 18, 1991, (Draft Document), Instrument Society of America.

Owen, S., et al. "A modular reconfigurable approach to the reation of flexible manufacturing cells for education purposes," Fast Reconfiguraciton of Robotic and Automation Resources (Colloquium) Oct. 20, 1995, The Institution of ElectricalEngineers, Digest No. 95/174.

Pace, Hugh W. "Valve Actuators Ready for Fieldbus," Control Engineer (Oct. 1995), pp. 65-73.

Petti, Thomas F. and Dhurjati, Prasad S. "A Coupled Knowledge Based System Using Fuzzy Optimization for Advisory Control," IChE Journal vol. 38 (Sep. 1992) No. 9, pp. 1369-1378.

Pfeifer T. and Fussel B. "Sensorbetribssystem fur messtechnische Problemstellungen in der Produktionstechnik," Technisches Messen vol. 58 (1991) Nos. 7/8.

Phinnery, Thomas L. "An Analysis of Contending Proposals in ISA SP-50 for an ISA/IEC Field Instrument Bus," ISA (1988) Paper #88-1489.

Preface: Field Bus Process Control User Layer Technical Support, Feb. 10, 1993.

Proway-LAN Industrial Data Highway. (Approved Feb. 3, 1986) ISA-S72.01-1985.

"Radio Field Bus," ISA/SP50—1988-184, ISA Draft.

Redman, Jun, et al. "Intranet and the internal Web server: A standard user interface for integrating manufacturing applications," Proceedings of the Industrial Computing Conference, vol. 6, No. 1 (1996).

Report from IEC TC65 Working Group 6 Function Blocks, May 1, 1995.

Schuur, C. "Comments on Analysis and Suggestions for ISA-SP50' as submitted to the SP50 Committee by Honeywell Inc." (Mar. 11, 1988) ISA-SP50-1988-155, ISA Draft.
Schuur, Chris and Warrior, Jay. "Philips Token Passing Field Bus Controller Timed Token Mode," ISA/SP50—1988-186, ISA Draft.
"SDRD Using 1553B Data Link Services," ISA/SP50-1988-243 (1988).
Skabowski, E. L. "Recommendations for Consideration at Oct. 1988 Application Layer Subcommittee Meeting," (Oct. 3, 1986).
Smith, Chris. "Tektronix Pushes Ease-of-Use and Low Cost of Operation With Its New Phaser.RTM. Color Laser Printer," comp.newprod forum (Jan. 11, 1996).
Solvie, Michael J. "Configuration of Distributed Time-Critical Fieldbus Systems," IEEE (1994), p. 211.
Strothman, Jim and Ham, John. "Alliances, Fieldbus, Windows Stir ISA/94 Anaheim Pot," INTECH (Dec. 1994), pp. 32-35.
Strothman, Jim and Ham, John. "ISA/95 New Orleans: 'Open', NT winds (not Opal) blow strong," INTECH (Nov. 1995), pp. 45-48.
"Suggested Outline for Application Sub-committee Document: Fieldbus Architecture Subcommittee Document," ISA/SP50-1988-175, ISA Draft.
Table of Contents, Automation & Technology Department, 1995.
Table of Contents, Automation & Technology Department, 1993.
Table of Contents, Proceedings of the Industrial Computing Conference, vol. 3, Sep. 19-24, 1993, Chicago, IL. Industrial Computing Society.
[Table of Contents], Proceedings of the 20th International Conference on Industrial Electronics Control and Instrumentation, vols. 1-3, Sep. 5-9, 1994, Bologna, Italy.
[Table of Contents], Proceedings of the 7th Mediterranean Electrotechnical Conference, vol. 1, Apr. 12-14, 1994, Antalya, Turkey.
Taylor, Ken, et al. "A Telerobot on the World Wide Web," Presented at the 1995 National Conference of the Australian Robot Association, Melbourne, (Jul. 5-7, 1995).
"User Layer Structure," SP-50 Technical Report (Jul. 25, 1990).
"User Layer Technical Report," ISA/SP50—1990-389C, ISA Draft.
Weinert, A., et al. "RT/OS—A realtime programming and application environment for the COSY control system," Nuclear Instruments and Methods in Physics Research A vol. 352 (1994), pp. 277-279.
WG1 List of Criteria (Appendix 1), (Oct. 21, 1988) ISA/SP50-1988-242, ISA Draft.
Wood, G. G. "The Argus CONSUL System for On-Line Computer Control," Electrical Engineering Transactions (Mar. 1969), pp. 114-118.
Wood, G. G. "The Challenge of Standards for Plant Communication," IFAC Distributed Computer Control Systems, (1982), pp. 191-192.
Wood, G. G. "Current Fieldbus activities," Computer Communications vol. 11 (Jun. 1988) No. 3, pp. 118-123.
Wood, G. G. "Evolution of communication standards for the process industry," Measurement + Control vol. 19 (Jul./Aug. 1986), pp. 183-188.
Wood, Graeme. "Fieldbus Status 1995," Computing & Control Engineering Journal (Dec. 1995), pp. 251-253.
Wood, Graeme. "Generic Link Transactions for Simple Devices in Fieldbus." ISA/SP50—1988—240 (Sep. 20, 1988).
Wood, Graeme, G. "Standardisation Work for Communication Among Distributed Industrial Computer Control Systems—A Status Report," INRIA (1984), pp. 67-69.
Wood, G. G. "Survey of LANs and Standards," Computer Standards & Interfaces vol. 6, (1987), pp. 27-36.
Wood, G. G. "Towards digital information control," Measurement + Control vol. 21 (Jul./Aug. 1988), pp. 179-180.
ICCard Design Sep./Oct. 1995.
Strack, Bob. "The Hawk is Soaring," Chemical Processing (May 1996) p. 11.
"Control System Features Plug-and-Play Technology, Scalability," Chemical Processing (May 1996), p. 33.
"Editors' Product Picks," Chemical Processing (May 1996), p. 34.
Control Shell Version 6.0 User's Manual, 426 pgs., Jan. 1999.
Invensys, "FoxDraw Display Builder and Configurator", 8 pgs., 2004.
Taylor, "Object Oriented Information Systems", 368 pgs., Apr. 10, 1992.
The Foxboro Company, "FoxCMS Change Management System Software," 48 pgs., Aug. 14, 1996.
Foxboro, "I/A Series Software FoxDraw", 8 pgs., 1996.
Foxboro, "Intelligent Automation Series Human Interface Software", 20 pgs., 1997.
Tinham, "Networks & surprises at C&I and ISA shows; Control and Instrumentation Exhibition and Conference; Instrument Society of America; includes related articles," vol. 26; No. 6, p. 43; ISSN: 0010-8022 (Jun. 1994).
Martin, "Design and Strategy for Distributed Data Processing", Chptrs. 19 & 20, pp. 272-305 (1981).
Tweney, "Java on Your Mobile Phone?", http://www.business2.com (Mar. 14, 2002).
Kostas, et al., "Real-Time Voice Over Packet-Switched Networks", pp. 18-27, IEEE Network (Jan./Feb. 1988).
Andrews, "15 MB in a Matchbook" (Jan. 1995)http://www.byte.com/art/9501/sec4/art5.htm.
Johnsson, et al., "High-Level Grafcet and Batch Control", Nov. 1994, Symposium ADPM.
Mori, et al., "The PCMCIA Developer's Guide, Second Edition," Sycard Technology 1994.
ANSI/ASME PTC 19.1-1985, "Part 1—Measurement Uncertainty", Apr. 30, 1986, entire document.
Kline, "The Purposes of Uncertainty Analysis", vol. 107, Journal of Fluids Engineering, pp. 153-160 (Jun. 1985).
Henry, "A New Approach to Sensor Validation", IMC, Mar. 17, 1992.
Henry, et al., "The Implication of Digital Communications on Sensor Validation," University of Oxford, Report No. OUEL 1912/92.
Henry, "Signal Processing, Data Handling and Communications: The Case for Measurement Validation," University of Oxford, Report No. OUEL 1912/92.
Henry, "Intelligent Behaviour for Self-Validating Sensors", University of Oxford, Report No. OUEL 1912/92.
Henry, et al., "A Standard Interface for Self-Validating Sensors", University of Oxford, Report No. OUEL 1884/91.
Hashemian, et al., "In-Situ Response Time Testing of Thermocouples", ISA 1989, Paper #89/0056, pp. 587-593.
Henry, "A Fault-Tolerant Interface for Self-Validating Sensors", Oxford University, Digest No. 1990/145 (Nov. 1990).
Miyoshi et al., "A Real-Time Java Server for Real-Time Mach", 1997, IEEE., pp. 319-325.
European Office Action, EP Application No. 97305187.3, dated Oct. 22, 2010.
Excerpt from the website of the Society of Manufacturing Engineers (SME)-CyberCut: A World Wide Web Based Design-to-Fabrication Tool, dated Sep. 16, 2010.
Smith, S. et al., "Cyber Cut: A world wide web based design-to fabrication tool", *Journal of Manufacturing Systems*, vol. 15/No. 6, Jan. 1, 1996, pp. 432-442.
U.S. Appl. No. 11/260,859, filed Oct. 28, 2005, Keyghobad et al.
"1995 World Batch Forum: Meeting of the Minds [Agenda]," (May 22-24, 1995) Newtown Square, Pennsylvania, (2 pages).
"Agenda," World Batch Forum 1994 (Mar. 6-9, 1994), Tempe, AZ, (9 pages).
"Apacs Control System," Power vol. 139, No. 6 (Jun. 1995) p. 81 (Dialog print-out).
"Application of PRIAM Model to Safety Systems on Offshore Oil/ Gas Platforms," Silvertech Ltd., Jan. 9, 1995.
"Company Profiles: What Users Need," Power vol. 139 No. 6 (Jun. 1995), p. 81.
"Control system," Power vol. 139, No. 4 (Apr. 1995) p. 114 (Dialog print-out).
"ControlShell Version 5.1 User's Manual," Real-Time Innovations, Jun. 1996, whole manual.
"DeltaV(tm) System: We Do Smart Plants." Brochure issued by Fisher-Rosemount Systems (1998).
"DeltaV.TM. System Overview: Do More." Brochure issued by Fisher-Rosemount Systems (1998).
"Fisher-Rosemount Is: Managing the Process Better," Fisher Controls International, Inc. and Rosemount Inc. 1993, (19 pages).

"Industries Fashion NASA Products Into Commercial Work", Anne Eisele, Space News, v9, n14, p. 14, Apr. 6, 1998, 1 page.
"Intel, SunDisk offerings narrow flash focus," Electronic Engineering Times, p. 10, Oct. 24, 1994.
"Introducing Bailey Evolution 90TM . . . The sound investment strategy for process automation," Bailey 1990 (brochure).
"Make Your Automation Plan a Reality: MAX1000," Leeds & Northrup Technical Overview, (approximately 1990).
"New Equipment/Literature," Control System vol. 139, No. 4 (Apr. 1995), p. 114.
"New Open Architecture Group Works on Control Standards," Control Engineering Online (Aug. 1997).
"New Telemecanique Programmable Controllers Feature Multiple Programming Languages," (Feb. 11, 1985).
"Plant Operations Framework," AMR report (May/Jun. 1995), (6 pages).
"Policy Manual," 1994 World Batch Forum (Mar. 6-9, 1994), (15 pages).
"Process Manager Specification and Technical Data," UC03-300 Sep. 1991 Honeywell, copyright 1990 (43 pages).
"Real-Time Innovations Email NewsLetter," Apr. 1998, http://www.rti.com/corporate/newsletter04-98, 2 pages.
"Ricoh to sell world's first multimedia still camera," Japan Economic Newswire, Feb. 21, 1995.
"RTI Announces Major New Component-Based Programming System for Building Complex Electromechanical Systems", PR Newswire, Mar. 16, 1998, 3 pages.
"Signal Conditioners Designed for Fisher-Rosemount System Delta V," issued by M-Systems Co., Ltd. (Dec. 1997).
"SP88 Mes Task-Force Europe Position Document," 1994 World Batch Forum (Mar. 6-9, 1994), (pp. 1-30).
"Sun announces availability of Javatm Embedded Server 1.0," Press Release dated Oct. 1, 1998, downloaded from java.sun.com website.
"Systems and Design; Technical Program and Exhibits Help Embedded Systems Design Professionals Keep Pace with Rapid Changes," PR Newswire, Dec. 27, 1995 (2 pages).
"TDC 3000 Overview," Honeywell, (approximately 1992).
"TDC 3000 Process Manager.TM.: Process Connected Solutions for the Advanced Controls Requirements of the 1990s," Honeywell, (approximately 1992).
"The Object Primer", Scott Ambler, pp. 1-248. Jan. 4, 1996.
"Toshiba Integrated Control System," Technical Manual Third Edition Nov. 1990.
"Tour an actual TribeLink via WebManage," web page print-out from http://www.tribe.com/products/webmanage/quick_view.htm (printed on Jul. 12, 1999) (1 page).
"TribeStar," web page print-out from http://www.tribe.com/products/tribestar/index.htm (3 pages) (copyright 1996).
"UDC 6000 Process Controller: From Stand-alone Control to Full System Integration Honeywell Has a Solution for You," Honeywell, (Aug. 1992).
"Wide-range, Fully Compatible Family of Process Automation & Management Systems," Copyright 1993 by Elsag Bailey Group as an Unpublished Work, (24 pages).
Adler, David J. et al. "Does a Manufacturing Execution System Reduce the Cost of Production for Bulk Pharmaceuticals?" 1995 World Batch Forum (May 22-24, 1995), (13 pages).
Ash, Raymond H. et al. "Strategic Needs in Batch Manufacturing," 1995 World Batch Forum (May 22-24, 1995), (8 pages).
Bader, F. P. "Building a Better Batch Control Foundation with IEC 1131-3 Control Languages," 1994 World Batch Forum (Mar. 6-9, 1994), (23 pages).
Baxter, Richard V., Jr. "Implementing Open Networking in a Motor Drive," The Imbedded Internet Workshop Real World Applications Session (Oct. 1, 1999) San Jose, CA.
Beestermoller, H.J., et al. "An Online and offline programmable Multi-Loop Controller for Distributed Systems," IEEE (1994), pp. 15-20.
Benner, Stephen J. "MES in Batch Process Manufacturing. A MES Vendor view" 1995 World Batch Forum (May 22-24, 1995), (8 pages).
Berge, Jonas, "Using Ethernet is a no-brainer," In Tech: The International Journal for Measurement and Control, pp. 36-39, Jul. 2000.
Berre, A., "Sharing of Objects in an Object-Oriented Language," Proceedings on the 1986 International Workshop on Object-Oriented Database Systems, IEEE Computer Society Press, Los Alamitos, CA, 1986.
Bishop, Brian. "Realtime System-Design Tool Models Electromechanical Systems", , Personal Eng & Instrumentation News, v15, n4, p. 21, Apr. 1998.
Bristol, E H., "Not a Batch Language: A Control Language!" 1995 World Batch Forum (May 22-24, 1995), (14 pages).
Brown, Jerry et al. "Meeting the Challenge of Automation Technology," 1996 World Batch Forum (May 22-24, 1995), (11 pages).
Brown, Jerry et al. "Trends and Opportunities in Batch Control System Architectures," 1994 World Batch Forum (Mar. 6-9, 1994), (pp. 1-12).
Bullotta, Rick. "Designing Effective User Interfaces for Batch Processes," 1994 World Batch Forum (Mar. 6-9, 1994), (pp. 1-19).
Choi, K.J. et al., "A Modeling Method of Software Configuration Change Control," 1997, IEEE Online, "htttp:/ieeexplorer.ieee.org/stamp/stamp.jsp?tp=&arnumber=619990&userType=inst".
Cisco Systems, Inc., "Cisco Secure Wireless Plant: Security and Quality of Service for Industrial Environments," Copyright 1992-2008.
Computer Products "Unbundling the DCS" (approximately 1992).
Conradi, R. et al., "Version Models for Software Configuration Management," Jun. 1998, ACM Computing Surveys, vol. 30, No. 2.
Distributed Engineering, Institute of Computer-Aided Circuit Design—Test and Test Systems Division, University of Erlangen-Nurnberg, Germany, web page print-out (8 pages) (Oct. 1994).
Duffey, C.K., et al. "High-Level Control Language Customizes Application Programs," IEEE Computer Applications in Power (1991), pp. 15-18.
ElRakabawy, et al., "Peer-to_Peer File Transfer in Wireless Mesh Networks," University of Leipzig, Copyright 2007 (incl. English Abstract).
Elsag Bailey, "Elsag Bailey Automation," (in Italian) (approximately 1993).
Excerpt from the website of the Society of Manufacturing Engineers (SME)-CyberCut: A World Wide Web Based Design-to-Fabrication Tool, dated Sep. 16, 2010.
Feiler, P., "Software Process Support Through Software Configuration Management," Oct. 1990, Proceedings of the 5th International Software Process Workshop on Experience with Software Process Models, IEEE Computer Society Press.
Ferraiolo et al., A Role-Based Access Control Model and Reference Implementation Whinin a Corporate Intranet, ACM, Feb. 1999.
Fisher, Thomas G P.E. "SP88 Update—Now and the Future," 1995 World Batch Forum (May 22-24, 1995), (59 pages).
Foxboro, I/A Series Software-FoxCTSTM—Change Tracking Software-Product Specifications, 1997-2006, pp. 1-12.
Friscia, Anthony et al. "MES: Manufacturing's Missing Link is a Tool for Change," 1994 World Batch Forum (Mar. 6-9, 1994), (8 page).
Fuhr et al., "Wireless Technology Review: Radios, Frequencies, and Implications for Industry," Wireless Technology Review, Feb. 2010.
George J. Thaler, et al., "Automatic Control Systems," pp. 1-60, 1989.
Gillespie, David P., Ph.D. "Comprehensive Information Management: EPA, OSHA, and Beyond," 1995 World Batch Forum (May 22-24, 1995), (14 pages).
Goldberg, Ken et al. "Desktop Teleoperation via the World Wide Web," IEEE International Conference on Robotics and Automation, pp. 654-659 (1995).
Goldberg, Ken, et al. "Beyond the Web: Excavating the Real World Via Mosaic," (Conference Paper) The Mercury Project (Oct. 17-21, 1994).
Goodstein, L.P. et al., "Representation of Process State Structure and Control," Apr. 1987, Riso National Laboratory.
Grant, Dr. R. Peter, "The Impact of Reengineering on the Batch Manufacturing Workplace," 1995 World Batch Forum (May 22-24, 1995), (5 pages).
Gutierrez, Jose, "WirelessHART™: The Industrial Wireless Standard," Measurement and Testing, Wireless Technology Focus, Jun./Jul. 2008.

Gyorki, John R. "PLCs drive standard buses," Machine Design (May 11, 1995), pp. 83-90.

HART Communication Foundation Tech Note, "Peer to Peer Communication with WirelessHART," HCF_LIT-129 Rev. 1.0, Sep. 5, 2008.

HART Communication Foundation Tech Note, "Peer to Peer Communication with WirelessHART," HCF_Lit-129 Rev. 1.1, Mar. 5, 2010.

HART Communication Foundation Tech Note, "System Redundancy with WirelessHART," HCF_LIT-128 Rev. 1.1, Mar. 5, 2010.

HART Communication Foundation, "Wireless Hart Overview," Copyright 2009, available at: http://www.hartcomm.org/protocol/wihart/wireless-overview.html.

Henry, Jim, Ph.D., P.E. "Implementation of Practical Control Systems: Problems and Solutions," web page print-out from http://chem.engr.utc.edu/Documents/MACSCITECH/MACSCITECHpaper1.html (printed on Apr. 10, 2001) (22 pages).

Hoek, A., Heimbigner, D., and Wolf, A.L.,"A Generic, Peer-to-Peer Repository for Distributed Configuration Management", May 1996, Proceedings of the 18th International Conference on Software Engineering Publisher, IEEE Computer Society.

Hohenstein, David. "Between the host and device . . . ," Intech (Jul. 2000), (6 pages).

International Search Report & Written Opinion, PCT/US09/47901, Mailed Jun. 19, 2009 (11 pages).

Kissling, Jeffrey L, "Flexible Software Structure and Change Management," 1995 World Batch Forum (May 22-24, 1995), (16 pages).

Kohler H. J., et al.,"Integrating UML Diagrams for Production Control Systems," ACM p. 241-251, 2000.

Loos, Peter. "Production Management—Linking Business Applications to Process Control," 1995 World Batch Forum (May 22-24, 1995), (pp. 1-16).

Loupos, Konstantinos et al., "VR, HF and Rule-Based Technologies Applied and Combined for Improving Industrial Safety," Lecture Notes in Computer Science, vol. 4555, Universal Access in Human-Computer Interaction, Ambient Interaction, pp. 676-680 (2007).

Lu, S. et al., "An Object-Oriented Power Plant Adaptive Control System Design Tool," Sep. 1995, IEEE Transactions on Energy Conversion, vol. 10, No. 3.

Magnusson, B., Asklund, U., and Minor, S., "Fine-Grained Revision Control for Collaborative Software Development", Dec. 1993, Proceedings of the 1st ACM SIGSOFT Symposium on Foundations of Software Engineering, ACM.

Mirabella, Orazio. "A Short Presentation of IEC Fieldbus Application Layer," Informatics and Communication Institute, Engineering Faculty, University of Catania, Italy, Feb. 14, 1995.

Morel, G., et al. "Discrete Event Automation Engineering: Outline of the PRIAM Project." BIAS '93, vol. 1, pp. 105-116, MILAN, Nov. 23-25, 1993.

Nobuhiko, Tsuji, et al. "An Advanced Optical Fieldbus Instrumentation System Using 16×16 Reflection Type Optical Star Coupler and Low Powered Transmitter," pp. 755-764, (1995).

Notte, Angelo J. "Multitasking Capability Simplifies Process Control Design" Reliance Electric Company, approximately late 1980s.

Ochoa, David. "Effects of Alliances and Acquisitions on the Batch Automation User," 1995 World Batch Forum (May 22-24, 1995), (43 pages).

Pages from Aspentech.com website as of Apr. 1999, retrieved from Internet archive http://web.archive.org.

Pages from Aspentech.com website as of Dec. 1997, retrieved from Internet archive http://web.archive.org.

Pages from Aspentech.com website as of Dec. 1998, retrieved from Internet archive http://web.archive.org.

Pages from Aspentech.com website as of Jan. 1997, retrieved from Internet archive http://web.archive.org.

Pages from Aspentech.com website as of Mar. 2000, retrieved from Internet archive http://web.archive.org.

Pages from Aspentech.com website as of Oct. 1996, retrieved from Internet archive http://web.archive.org.

Pages from SL.com website as of Apr. 1999, retrieved from Internet archive http://web.archive.org.

Pages from SL.com website as of Dec. 1998, retrieved from Internet archive http://web.archive.org.

Pages from SL.com website as of Feb. 1997, retrieved from Internet archive http://web.archive.org.

Pages from SL.com website as of May 2000, retrieved from Internet archive http://web.archive.org.

Peshek, Clifford J., et al. "Recent Developments and Future Trends in PLC Programming Languages and Programming Tools for Real-Time Control," IEEE Cement Industry Technical Conference (May 1993) Toronto, Canada, pp. 219-230.

Pinto, Jim. "The Great Fieldbus Debate—is Over," Action Instruments (www.actionio.com) (originally published in Industrial Controls Intelligence, Nov. 1999).

Press Release from Real-Time Innovation announcing ControlShell version 6.0 for sale/for use, Apr. 1998, 2 pages.

Product Specifications, I/A Series(R) Software FoxGuard(TM) Manager for Triconex(TM) Safety Systems, Copyright 2000-2006, Invensys Systems, Inc.

Reklaitis, G. V. "Scheduling Approaches for the Batch Process Industries," 1995 World Batch Forum (May 22-24, 1995), (17 pages).

Robinson, D. et al., "Modelling and Synthesis of Configuration Controllers for Dynamically Reconfigurable Logic Systems Using the DCS CAD Framework," 1999, Field-Programmable Logic and Applications, FPL '99, pp. 41-50.

Rosenof, Howard P. "Dynamic Scheduling for a Brewery," 1995 World Batch Forum (May 22-24, 1995), (6 pages).

Schreiber Philip et al. "Process Automation Using SP88," 1995 World Batch Forum (May 22- 24, 1995), (7 pages).

SNAP Foundation Template "Using the SNAP Development Environment," Version 8.0, Chapters 1-4, 1997.

Song, Jianping et al., "Challenges of Wireless Control in Process Industry," Workshop on Research Directions for Security and Networking in Critical Real-Time and Embedded Systems, Apr. 4, 2006, San Jose, CA, USA; available at http://moss.csc.ncsu.edu/~mueller/crtes06.

Stapleton, Nick. "802.3 Working Group DTE Power via MDI Call for interest," 3Com (Jul. 1999), (15 pages).

Stevens, et al. "TCP/IP Illustrated, vol. 1. The Protocols," TCP/IP Illustrated vol. 1, XP-002106390, pp. 85-96. (1994).

Strobhar, David A. "Evolution of Operator Decision Making," 1995 World Batch Forum (May 22-24, 1995), (6 pages).

Table of Contents, Industrial Computing Society Conference ICS/95, New Orleans, LA, Oct. 1-6, 1995.

U.S. Appl. No. 09/573,151, filed May 17, 2000, Linscott, Richard L.

United States Patent and Trademark Office final Office Action for U.S. Appl. No. 11/354,586, mailed Aug. 4, 2009.

United States Patent and Trademark Office final Office Action for U.S. Appl. No. 11/354,586, mailed Jul. 1, 2008.

United States Patent and Trademark Office final Office Action for U.S. Appl. No. 11/781,216, mailed Jan. 8, 2009.

United States Patent and Trademark Office final Office Action for U.S. Appl. No. 11/781,218, mailed Jan. 28, 2009.

United States Patent and Trademark Office final Office Action for U.S. Appl. No. 11/781,219, mailed Nov. 14, 2008.

United States Patent and Trademark Office non-final Office Action for U.S. Appl. No. 11/354,586, mailed Jan. 8, 2009.

United States Patent and Trademark Office non-final Office Action for U.S. Appl. No. 11/354,586, mailed Mar. 6, 2007.

United States Patent and Trademark Office non-final Office Action for U.S. Appl. No. 11/354,586, mailed Nov. 1, 2007.

United States Patent and Trademark Office non-final Office Action for U.S. Appl. No. 11/781,216, mailed Aug. 7, 2008.

United States Patent and Trademark Office non-final Office Action for U.S. Appl. No. 11/781,219, mailed Jul. 14, 2008.

United States Patent and Trademark Office non-final Office Action for U.S. Appl. No. 11/207,816, mailed Apr. 9, 2007.

United States Patent and Trademark Office non-final Office Action for U.S. Appl. No. 11/207,816, mailed Jan. 10, 2008.

United States Patent and Trademark Office non-final Office Action for U.S. Appl. No. 11/207,816, mailed Jul. 3, 2008.

United States Patent and Trademark Office non-final Office Action for U.S. Appl. No. 11/207,816, mailed Oct. 4, 2006.

United States Patent and Trademark Office non-final Office Action for U.S. Appl. No. 11/207,816, mailed Sep. 19, 2007.

United States Patent and Trademark Office non-final Office Action for U.S. Appl. No. 11/781,218, mailed Sep. 15, 2008.

United States Patent and Trademark Office non-final Office Action for U.S. Appl. No. 11/781,219, mailed Jul. 21, 2009.

Van de Pol. "OmniChem: Real Time Production scheduling in a batch oriented environment," 1994 World Batch Forum (Mar. 6-9, 1994), (23 pages).

Vardy, Joel M. "Integrating Manufacturing Into the Corporate Reengineering Effort for the Batch Industries," 1995 World Batch Forum (May 22-24, 1995), (23 pages).

Wang, Lithui et al. "Agent-based Intelligent Control System Design for Real-time Distributed Manufacturing Environments". Agent-based Manufacturing Workshop, Autonomous Agents '98. Minneapolis/St. Paul, May 9-13, 1998, pp. 152-159.

Webb, Marcus. "Computer System Implementation, Batch Standards and Validation," 1995 World Batch Forum (May 22-24, 1995), (11 pages).

Young, Stephen L. "Technology . . . The Enabler for Tommorrow's Agile Enterprise," 1995 World Batch Forum (May 22-24, 1995), (10 pages).

Zeller, A. and Snelling, G., "Unified Versioning Through Feature Logic," Oct. 1997, Transactions on Software Engineering and Methodology, vol. 6, Issue 4, ACM.

* cited by examiner

METHODS FOR PROCESS CONTROL WITH CHANGE UPDATES

This is a continuation of Ser. No. 10/765,006, filed Jan. 26, 2004, entitled METHODS AND APPARATUS FOR REMOTE PROCESS CONTROL, which is a continuation of Ser. No. 09/379,074, filed Aug. 23, 1999, entitled METHODS AND APPARATUS FOR REMOTE PROCESS CONTROL, which is a continuation of Ser. No. 08/700,199, filed Aug. 29, 1996, entitled METHODS AND APPARATUS FOR REMOTE PROCESS CONTROL, the teachings of all of which are incorporated herein by reference.

BACKGROUND OF THE INVENTION

The invention pertains to process control and has application to remote process control.

Process control refers to the control of the operational parameters of a system by monitoring one or more of its characteristics over time. It is used to insure that the quality and efficiency of the system remain within desired parameters over the course of time. While process control is typically employed in the manufacturing sector for process, repetitive and discrete manufactures, it also has wide application in service industries, such as environmental control.

Process control equipment typically utilizes control/sensing devices that are physically integrated into the systems being controlled. For example, a thermostat is typically used in environmental control to insure that building temperatures remain within specified parameters. Likewise, flow control sensors and automated valves are typically used in process manufacturing to insure proper fluid flow volumes.

Though in early process control systems, control/sensing devices were typically stand-alone units, modern process control systems provide central workstations for monitoring and controlling the control sensing devices. Particularly robust systems are the I/A Series industrial automation systems designed, manufactured and marketed by the assignee hereof, The Foxboro Company, of Foxboro, Mass., USA. In these systems, multiple control/sensing devices are coupled by way of buses to control stations which, in turn, are coupled by way of a local area network (LAN) to one or more operator workstations.

The I/A Series systems are built around the client/server model. Client applications software executing on the workstations exchange information with the control/sensing devices via a server, referred to as the "object manager," executing in distributed fashion in the control stations. Upon request by a client application, the server creates, locates, accesses and updates data structures ("objects") storing information on the status of at least selected control/sensing devices. For example, a client application that displays temperatures sensed by a thermocouple requests that the server create an object storing a temperature reading from the thermocouple and that the server notify the client each time the temperature changes.

Although modern process control systems, such as the I/A Series systems, have proven quite successful, to date they have provided only limited remote access capabilities. Thus, while numerous operator workstations may reside within the factory or facility in which the control/sensing devices are disposed, it has traditionally proven difficult to access and control those devices outside those areas.

Remote access and control of processes is desirable for a number of purposes. A plant manager who is "on the road," for example, may wish to monitor the plant processes while travelling. By way of further example, the manufacturer of process control equipment may require remote access to a plant's control/sensing devices in order to provide technical support.

An object of this invention is to provide improved methods and apparatus for process control.

Another object of the invention is to provide such methods and apparatus as permit monitoring and control of remote processes.

Still another object of the invention is to provide such methods and apparatus as can be readily adapted to existing automated process control systems.

Yet still another object of the invention is to provide such methods and apparatus as can be implemented without undue expense and without undue consumption of resources.

SUMMARY OF THE INVENTION

The aforementioned objects are among those attained by the invention, which provides, in one aspect, a system for process control comprising a server digital data processor and a client digital data processor that are coupled by a network, such as the Internet or an Intranet. The server digital data processor, which is additionally coupled to a control/sensing device and associated interface equipment (collectively, referred to as "process control apparatus"), includes a command processor that transfers information between the network and the process control apparatus.

The client digital data processor includes an information client (e.g., an Internet web browser) capable of requesting and receiving an applet from the server digital data processor. That information client, further, defines a hardware-independent and operating system-independent virtual machine environment within the client digital data processor.

The client digital data processor executes, within that virtual machine environment, an applet that configures the client digital data processor as a "process controller" that establishes communications over the network with the command processor and that monitors and/or controls the process control apparatus via those communications. The applet is intermediate or executable code that is suitable for interpretation or execution within the virtual machine environment and that is hardware-independent, operating system-independent and windows system-independent In further related aspects, the aforementioned applet can be, for example, JAVA programming language bytecode, and the virtual machine environment can be that created by a JAVA-enabled web browser.

According to other aspects of the invention, the command processor in a system for process control as defined above provides services (i.e., "software services") for access and modification of information regarding the process control apparatus. These services can permit, for example, the creation of a data structure object that stores information about the process control apparatus and that associates a name with that object; the destruction of such an object; the accessing of information in such an object; the updating of information in such an object; the determination, from an object name, of the physical address of the object; and the notification of changes in information stored by the object. The process controller generates and transmits over the network to the command processor requests for such services in order to monitor and/or control the process control apparatus.

A further aspect of the invention provides a system as described above in which the process controller generates and transfers commands (e.g., requests for service) over the network to the command processor in order to effect a transfer from the command processor of information regarding a status of the process control apparatus. The command processor responds to those requests by generating information on the status of the process control apparatus and transferring it back to the process controller over the network. The process controller can, for example, generate a user display based on that information.

In a related aspect, the command processor responds to selected commands (i.e., requests for event-driving access) by notifying the process controller of changes in the status of at least selected aspects of the process control apparatus. By way of example, where the process control apparatus includes a thermocouple, this aspect of the invention permits notification of the command processor whenever the thermocouple senses a change in temperature that exceeds a predetermined delta value.

Still further aspects of the invention provide process control systems as described above in which the server digital data processor includes an information server (e.g., a hypertext transfer protocol server). An information client (e.g., web browser) in the client digital data processor establishes communications with the information server over the network and receives therefrom a hypertext markup language (HTML) document referencing the applet. The web browser generates a user display of that document and, in response to a user command, transfers to the information server a request for the applet.

Yet still further aspects of the invention provide systems for process control in which a first digital data processor executes a JAVA applet within a virtual machine environment defined on the digital data processor. The applet configures the digital data processor to generate a message to invoke a method in connection with monitoring and/or controlling a process control apparatus. An object manager, which is in communication with the JAVA applet, responds to the message for invoking the method.

Other aspects of the invention provide methods for process control paralleling the operations of the systems described above.

These and other aspects of the invention are evident in the drawings and in the detailed description that follows.

BRIEF DESCRIPTION OF THE DRAWINGS

A further understanding of the invention may be attained by reference to the drawings, in which.

DETAILED DESCRIPTION OF THE ILLUSTRATED EMBODIMENT

Figure 1:
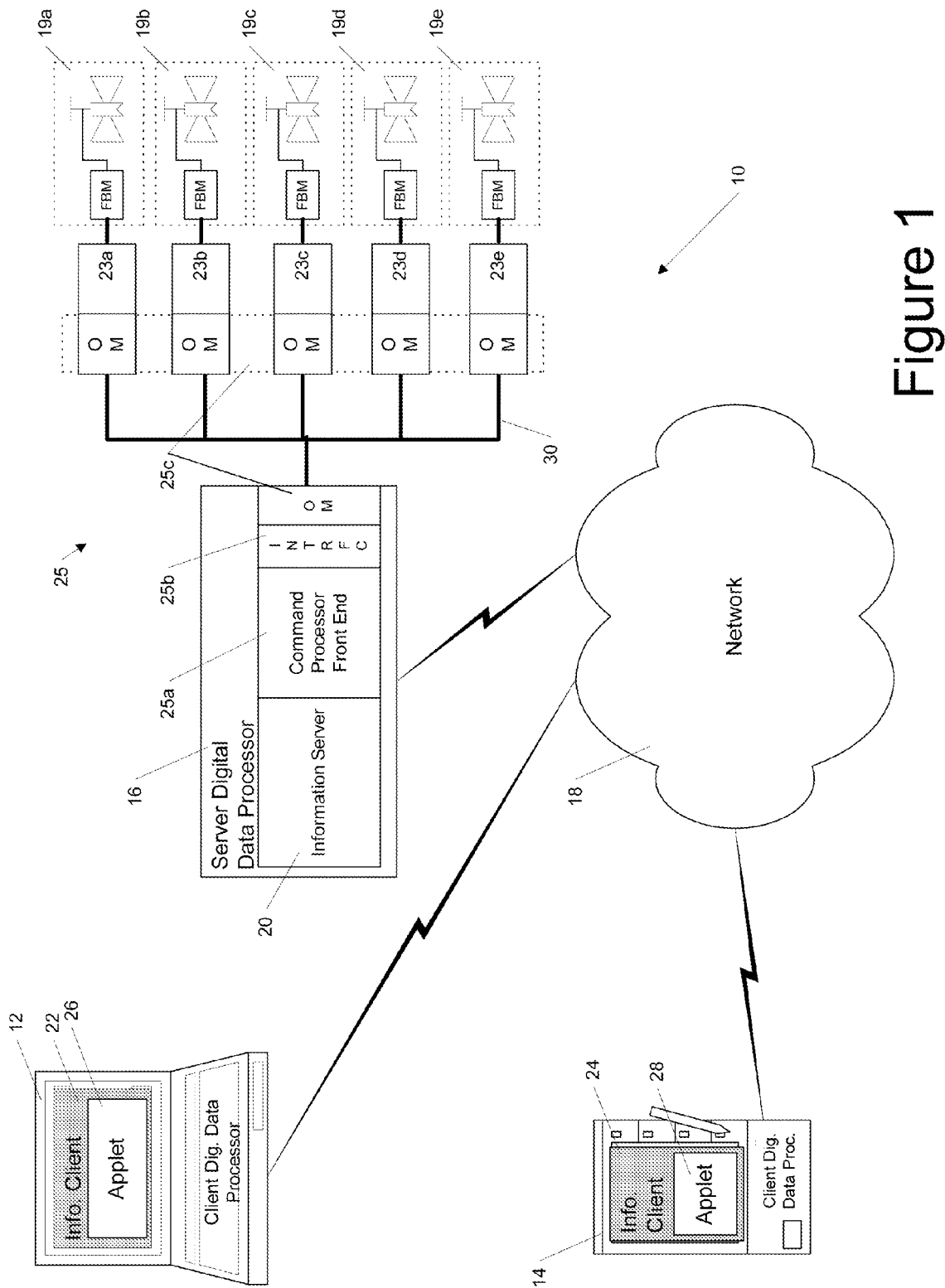
FIG. 1 depicts a system for process control according to the invention.

FIG. 1 depicts a system 10 for process control according to the invention. The system includes client digital data processors 12, 14 and server digital data processor 16. The digital data processors 12, 14, 16 are connected to one another via network 18.

Server digital data processor 16 is, additionally, coupled to process control apparatus 19a-19e via bus/network structure 30 and control stations 23a-23e, as shown. The process control apparatus include conventional control/sensing devices, which are shown in the illustration as flow control valves, and associated interface equipment, which are marked "FBM" in the illustration. The process control apparatus 19a-19e are intended to represent any conventional control/sensing devices and interface equipment of the type conventionally used to monitor and control processes—including, by way of non-limiting example, continuous, repetitive and discrete processes, and environmental control processes, among others.

As discussed below, control stations 23a-23e include objects storing information that control, and reflect the status of, their associated process control apparatus 19a-19e. The control stations 23a-23e also execute object management software (marked "OM") that manage and oversee access to those objects. The control stations 23a-23e are of the type conventionally used in a distributed process control architecture. Preferred such control stations are commercially available from the assignee hereof, The Foxboro Company, as part of its I/A Series industrial automation systems.

The digital data processors 12, 14, 16 comprise conventional digital data processing systems of the type commercially available in the marketplace. Though client digital data processors 12, 14 are illustrated as a portable computer and a personal digital assistant, respectively, those skilled in the art will appreciate that these may comprise other computing systems, such as desktop computers and workstations, as well. The digital data processors 12, 14, 16 may be coupled to the network 18 directly, as shown, or other networks (e.g., LANs and WANs), routers, or interface servers (not shown).

The network 18 comprises any conventional digital data processing network (e.g., LAN or WAN), cable television-based network, wireless network and/or any telecommunications-based network capable of supporting communications between server digital data processor 16 and client digital data processors 12, 14. The network 18 preferably comprises the global Internet and/or an enterprise-based Intranet supporting communications via the TCP/IP protocol (i.e., the current standard protocol of the Internet). Utilization of networks supporting this protocol is advantageous insofar as it permits the use of commercially available products (such as web browsers, discussed below) in components of the illustrated embodiment. Those skilled in the art will appreciate that the invention is applicable to networks supporting other protocols, as well.

The digital data processors 12, 14, 16 execute software that respectively configure them for communication over the network 18. For example, they execute protocol stacks and other software that permit them to establish and carry out communications utilizing the TCP/IP network protocol. In addition, they execute information client/server software that configures them to carry on high-level communications, particularly, over the Internet.

More particularly, in the illustrated embodiment, server digital data processor 16 includes information server 20 responsible for establishing communications over network 18 with information clients executing on the client digital data processors 12, 14.

The information server 20 is preferably a hypertext transfer protocol (HTTP) server capable of transferring markup language information and, particularly, hypertext markup language (HTML) documents, to the client digital data processors 12, 14. In alternative embodiments of the invention, information server 20 can comprise any other such server capable of supplying an applet to the client digital data processors 12, 14 in response to requests by them.

The information server 20 establishes communications with the client digital data processors 12, 14 and, particularly, their respective information clients in the conventional manner known in the art. Once communications are established, the information server transfers to the information client an applet that executes within the virtual machine environment and that monitors and/or controls the process control apparatus via communications with a command processor in the server digital data processor 16, as discussed below.

The client digital data processors 12, 14 include information clients 22, 24, respectively, that are responsible for initiating and conducting at least preliminary communications with the server digital data processor 16 over the network 18. The information clients 22, 24, particularly, (1) initiate communications with the information server 20 over the network, (2) request and receive from the information server 20 an applet, and (3) define a platform-independent (i.e., a hardware-independent, operating system-independent and window system-independent) virtual machine environment within the respective client digital data processor 12, 14. Such information clients are, in one embodiment, JAVA-compliant web browsers including the HotJava browser from Stm MicroSystems, Inc., NetScape Navigator from Netscape Communications Corporation, and the Internet Explorer from Microsoft Corporation.

As used herein, an applet is intermediate or executable code suitable for interpretation or execution within the virtual machine environment and that is hardware-independent, operating system-independent and windows system-independent. Preferred applets are in the form of Java bytecode of the type generated by the Java language compiler available from Sun Microsystems, Inc.

The aforementioned preferred web browsers define a preferred virtual machine environment comprising the Java programming language run-time platform and Java interpreter.

Although a preferred information client is a web browser, the invention can be practiced with other information clients capable of (1) initiating communications with the information server 20, (2) requesting and receiving from the information server 20 an applet, and (3) defining a platform-independent (i.e., a hardware-independent, operating system-independent and windows system independent) virtual machine environment within the respective client digital data processor 12, 14 for execution of such an applet.

In addition to information server 20, server digital data processor 16 includes command processor 25, comprising front end 25a, interface section 25b, and an object manager 25c. Together, these transfer information between the network 18 and process control apparatus 19a-19e. As shown in the illustration, the object manager functionality is distributed among the control stations 23a-23e. Each object manager maintains the data structures—to with, objects—that control and reflect the status of its associated process control apparatus 19a-19e.

The object manager 25c provides software services for access that permit the creation of named objects; destruction of such objects; accessing and updating of information in the objects; the locating of objects within the distributed process control architecture; and notification of changes in the information stored in objects (i.e., event-driven notification).

As noted, the object manager 25c allows uniquely named objects to be distributed over the control stations 23a-23e in a location-independent way. Using the object manager 25c (via front end 25a), applets 26, 28 may create, read, write, and destroy instances of objects, which are subtyped into four categories: variaible—used to contain an instance of any scalar data type (e.g., int, float, etc.) or a string; alias—used to contain a string which refers to the name of another object; device—used to identify a station or device in the system. An instance of a device type object contains no explicit state— the name of the object is itself the state; and process—used to identify an executing process in the system. A process object is identical to a device object in that there is no explicit state.

As indicated above, in order to manipulate instances of objects, the object manager 25c provides life cycle services, access services and connection services. Life cycle services are used to create, name, and destroy shared objects; to register the name of process-control objects; and to find the location of any object. Access Services are used to get and set the value of one or more process-control and/or shared objects. Typically, access services are suitable for situations where a single transfer of data is sufficient.

Connection services are also used to get and set the value of one or more process-control and/or shared objects. However, these services are more suited for situations where multiple transfers of data are expected. In addition, connection services provide the ability for a client to be continuously updated with the value of an object when it exceeds a specified delta.

The object manager 25c relies upon the use of broadcasts over bus stricture 30 in order to perform the above services. For example, when an applet 26, 28 makes an access request on an object by name, the object manager 25c will broadcast the access request to all stations 23a-23e, if the object manager 25c does not know the location of object. Each station 23a-23e then determines if it is the one that hosts the requested object. Only the station that hosts the named object responds to the request.

A preferred object manager 25c is that commercially available from the assignee hereof, The Foxboro Company, as part of its I/A Series of industrial automation systems. A software interface, or "API," of that preferred object manager is described in publicly available documentation, including the document entitled "Object Manager Calls," a copy of which is filed as an appendix with this application.

The command processor front end 25a executes on server digital data processor 16, configuring it to respond to requests from applets 26, 28 to establish communications with them over the network 18. Once communications are established, the front end 25a responds to requests received from applets 26, 28 over network 18 to transfer information to and from process control apparatus 19a-19e via the object manager 25c.

Particularly, the front end 25a responds to requests received over the network in TCP/IP protocol to generate calls to object manager 25c in accord with its aforementioned API. Moreover, the front end 25a responds to information generated by the object manager 25c in response to those calls by transmitting that information back over the network 18, in accord with the TCP/IP protocol, to the applets 26, 28. In a preferred embodiment, the front end 25a presents a simplified interface to the object manager 25c, e.g., permitting applets 26, 28 to make requests and receive responses in the form of text strings, as discussed below.

Software implementing a preferred front end 25a as a Java programming language application is filed as appendix with this application. Those skilled in the art will appreciate that alternate embodiments may implement the front end in other programming languages suitable for, or that can be adapted to, provide an interface between the network 18 protocol and the object manager 25c.

Interface section 25b provides a software interface between the front end 25a and the object manager 25c. As noted above, in a preferred embodiment, the front end 25a is implemented as a Java programming language application. The object manager 25c, on the other hand, is implemented as a C programming language application and, accordingly, its API includes pointer-based parameters. The interface section 25b compensates for the inability of the Java front end 25a to utilize pointer-based parameters, e.g., by converting them to arrays as discussed further below.

Software implementing a preferred interface section 25b in the C programming language is filed as appendix with this application. Those skilled in the art will appreciate that interface section 25b is optional and may be excluded in embodiments where the front end 25a can make calls directly to the object manager 25c.

The client digital data processors 12, 14 execute applets 26, 28 within the virtual machine environments defined by the information clients 22, 24. Each applet 26, 28 configures its respective client digital data processors as a process controller that establishes communications over the network 18 with the command processor front end 25a and that monitors and/ or controls the process control apparatus 19a-19e via those communications. More particularly, the process controllers generate and transfer requests for service over the network 18 to the command processor 25 so as to effect the transfer of information controlling, and reflecting the status of, the process control apparatus 19a-19e. The process controllers also receive information from the command processor 25, e.g., for display to an operator.

As noted above, the applets 26, 28 comprise intermediate or executable code that is interpreted or executed with in the virtual machine environment defined by the information clients and that is hardware-independent, operating system-independent and windows system-independent. Source code for preferred applets, in the Sun MicroSystems Java programming language, is provided in the appendix filed with this application.

Figure 2:
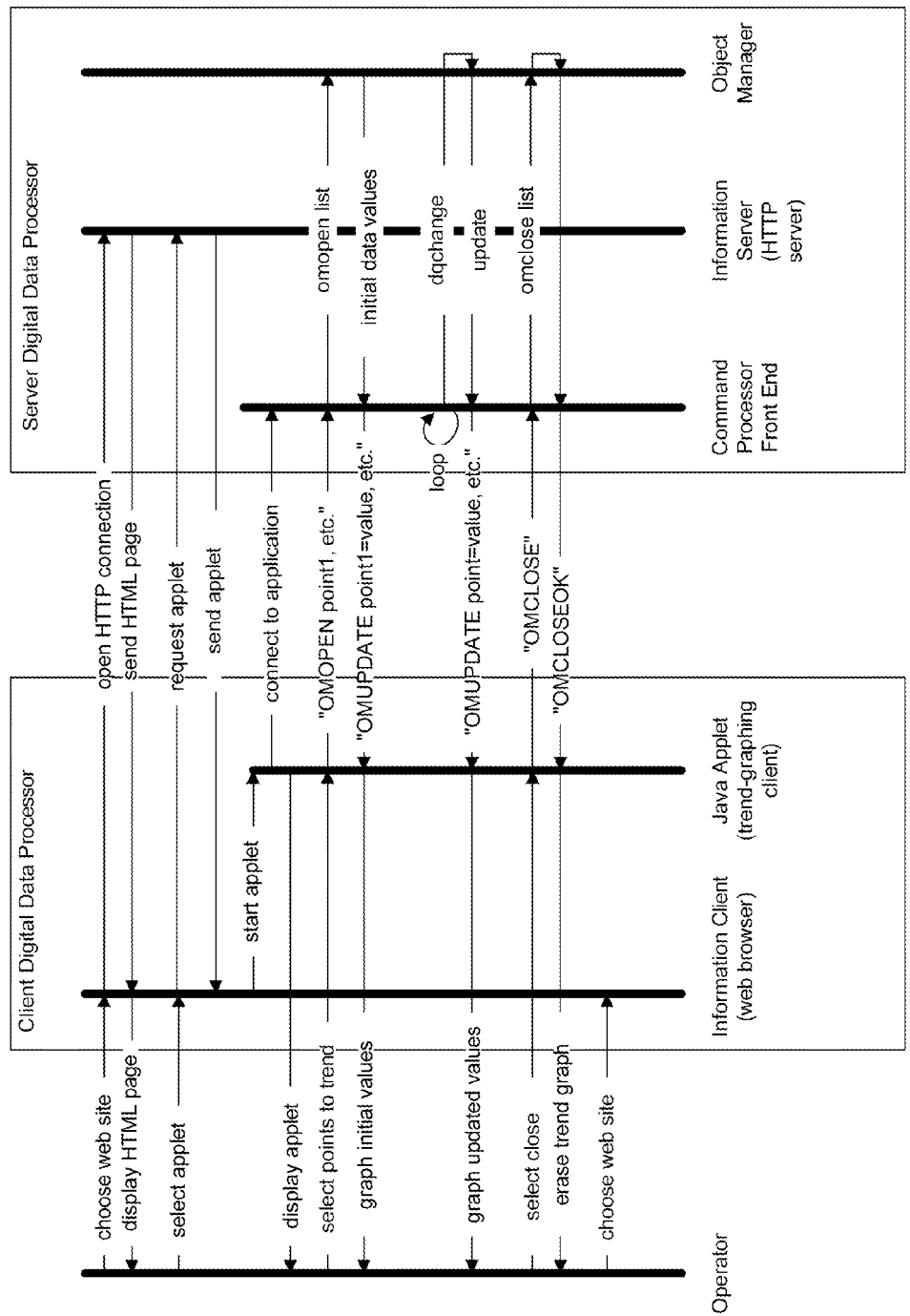
FIG. 2 is an event trace diagram depicting messages that flow among the components of the system of FIG. 1 in an embodiment for graphing tends in process control apparatus data values.

A process control system constructed and operated in accord with system 10 of FIG. 1 can be employed in a wide variety of process control embodiments. One such embodiment is shown in FIG. 2 and described below. That embodiment provides for generation, by an applet executing on the client digital data processor, of graphs showing trends in data values of process control apparatus coupled to a server digital data processor.

FIG. 2 is an event trace diagram depicting messages that flow among the components of the system 10 of FIG. 1 in the above-mentioned embodiment. The components of the system 10 are shown in the event trace diagram as vertical lines with the name of the component at the bottom of the line. Messages are represented by arrows. Each message flows in the direction of the arrow from component to component. Messages that happen earlier in time are toward the top of the diagram.

Referring to FIG. 2, communication begins with the operator signalling the information client 22 to establish communications with the server digital data processor 16 over the network 18. The operator can signal the information client, e.g., a keyboard stroke or "mouse" click on the operator console (not shown). In the illustrated embodiment, the information client 22 is the Netscape web browser.

In response the operator's request, the information client 22 generates and transmits over network 18 a request for connection with information server 20, e.g., an HTTP server, executing on server digital data processor 16. Once the connection is established, the HTTP server 20 sends to the web browser 22 an HTML page that references (i.e., provides an address for) a trend-graphing applet. The HTML page also optionally includes text and graphics describing the applet.

The web browser 22 displays the HTML on the operator console. If the operator signals the web browser 22 that he or she wishes to access the applet, the web browser 22 transmits to the HTTP server 20 over the network 18 a request for the applet. It will be appreciated that the applet may be transmitted to the web browser 22, along with an initial HTML document.

The HTTP server 20 responds to such a request for forwarding Java bytecode for the applet over the network 18 to the web browser 22. On receipt of the applet, the JAVA-compatible web browser 22 executes the applet 26 in the virtual machine environment defined in the web browser 22.

Once executing, the applet 26 sends a request to establish a separate communications link over the network 18 with the command processor front end 25a, e.g., a Java application executing on the server digital data processor 16. This separate connection is used by the applet 26 and the front end 25a to permit the exchange messages over the network and, particularly, to permit the applet 26 to make requests of the command processor 25 for process control apparatus data to be graphed.

Once communications are established, the applet 26, 28 generates a display on the operator console of the client digital data processor 12 and permits the operator to enter the names of process control apparatus data values (i.e., "points") that are to be graphed. On the operator's command, the applet 26 sends a request over the network 18 to the front end 25a specifying the OMOPEN service and listing the names of operator-specified points. The request is in text or ASCII format, e.g., "OMOPEN name1; name2; name3; etc."

On receipt of the OMOPEN request, the front end 25a creates a data structure required by object manager 25c, to with an OM list, and includes in that data structure the names of the specified points. The front end 25a then makes an "omopen list" call to the object manager 25c utilizing the aforementioned API. A further understanding of the OM list data structure and of the "omopen list" call, as well as the other data strictures and calls to the object manager 25c, may be attained by reference to the appendix filed with this application.

The object manager 25c responds to the omopen list call by querying the respective process control apparatus 19a-19e for current data values for the points. The object manager 25c returns those data values to the front end 25a which, in turn, generates and transmits to the applet 26, 28 a text message listing the initial data points. That message includes the keyword OMUPDATE, followed by the names and values of each of the points, e.g., "OMUPDATE point1=value; point2=value; etc." The applet 26, 28 graphs those initial data points on the operator console.

The object manager 25c then begins looping, while awaiting further requests from the client applet 26 and while awaiting updates on the data values from the object manager 25c. When such an update is received, the front end 25a generates and transmits to the applet 26 a further text message in the form "OMUPDATE point1=value; point2=value; etc." listing the updated data values points. The applet 26 graphs those initial data points on the operator console at the end of the graph time interval.

The front end 25a continues looping and forwarding updates until the operator signals the applet 26 to stop trend graphing. In that event, the applet 26 sends a close request over the network to the front end 25a in the form of a text message "OMCLOSE." On receipt of that request, the front end 25a, in turn, makes an omclose list call to the object manager 25c in accord with the aforementioned API. When that call returns, front end 25a sends an "OMCLOSEOK" text message to the applet, 26 causing it to clear the trend graph.

At this point, the operator can either specify new points to the applet 26 or can tell the web browser 22, 24 to connect to a different information server. If the operator signals that he or she wishes to connect to another server, the client applet 26 breaks the connection with the server by sending an "OMBREAK" message to the front end 25*a* over the network. The front end 25*a* than resets, and waits for the next connection.

In a preferred embodiment, the method illustrated in FIG. 2 is implemented in the Java programming language. As those skilled in the art will appreciate and as discussed above, all Java applets and Java applications run inside of a Java Virtual Machine. All implementations of the Java Virtual Machine are guarantied to be identical regardless of the many hardware platforms on which they run.

The above-described trend-graphing client Java applet preferably runs in the Java Virtual Machine that is implemented by Netscape Navigator version 2.02. The trend client applet 26 is intended to be portable. So it only uses those classes that are present in all implementations of the Java systems. The trend-graphing applet 26 uses Java system classes to manage the screen, and connect to the trend server, and provide timing intervals.

The trend-graphing applet 26 implements classes that conduct all operator interaction. For example, it accept the names of the points to be graphed. It also defines the GUI buttons used by the operator to signal when graphing is to start or stop. Further, the trend-graphing applet 26 plots X-Y axes, graph the points, and parses messages from the front end 25*a*.

The applet 26 also processes the following messages from the server: "OMUPDATE name2=value; name3=value; . . . "; OMCLOSEOK.

The illustrated front end 25 (or "trend-graphing server") is not portable to just any Java Virtual Machine because it must call outside of the Java environment to the object manager 25*c*. To do this, the trend server class is defined to have "native methods". A "native method" is any member function of a class that is implemented in a language other than Java. A native method can enable access to functions and data that are "native" to a particular hardware platform operating system or a running application (like the object manager 25*c*).

Native member functions are declared in the class as native. They are implemented in a library that is loaded by the Java environment at runtime. On Solaris this is a libfile.so file. On Windows NT this would be a library.dbl file. The native methods, which constitute the interface 25*b*, are defined to create a new OM list, add a named point to the list, open the list, check the list for updates (using dqchange), and close the list. Source code for a preferred implementation of native methods is supplied in the appendix filed with this application.

The command processor front end 25*a* runs in a Solaris implementation of the Java Virtual Machine. The front end 25*a* processes the following messages from the applet 26: "OMOPEN name1; name2; name3; . . . " (in response to which it creates a list with the specified points and opens the list): "OMCLOSE" (in response to which it closes the list); and "OMBREAK" (in response to which reset and wait to accept a new connection).

Described above and illustrated in the drawings are improved methods and apparatus for process control. Those skilled in the art will appreciate that the embodiments discussed above and shown in the claims are merely illustrative and that other embodiments incorporating modifications within the reach of one of ordinary skill in the art fall within the scope of the invention, of which we claim:

The invention claimed is:

1. A method of operating a control system of the type having a control apparatus comprising one or more control/sensing devices, the method comprising the steps of
   A. executing a program that configures a digital data processor as a process controller for monitoring and/or controlling the control apparatus, the program comprising any of (i) a JAVA applet, (ii) an intermediate language program, (iii) a byte code program, (iv) a downloaded program that executes in a virtual machine environment, (v) a program that executes in a web browser,
   B. responding to a request for a data value associated with the control apparatus by transmitting to the digital data processor that data value and one or more subsequent changes thereto.

2. A method of claim 1, comprising the generating the request for the data value with the digital data processor, when configured as a process controller.

3. A method according to claim 1, comprising executing the program so as to configure the digital data processor to report at least one of the data value and subsequent changes thereto.

4. A method according to claim 1, comprising communicating between the digital data processor and the control apparatus via a network.

5. A method according to claim 4, comprising communicating between the digital data processor and the control apparatus via a further digital data processor.

6. A method according to claim 5, comprising communicating between the digital data processor and the further digital data processor via a network.

7. A method according to claim 5, comprising communicating between the server digital data processor and the control apparatus by any of a bus and a network.

8. A method according to claim 5, comprising transmitting from the digital data processor to the further digital data processor a request for the data value.

9. A method according to claim 1, wherein the client digital data processor generates a request for the program.

10. A method according to claim 1, comprising maintaining with at least one of the further digital data processor and the control apparatus one or more objects that at least one of control and reflect a status of the control apparatus.

11. A method of operating a control system of the type having a control apparatus comprising one or more control/sensing devices, the method comprising the steps of
   A. executing on a client digital data processor a program that configures the client digital data processor as a process controller for monitoring and/or controlling the control apparatus, the applet comprising any of (i) a JAVA applet, (ii) an intermediate language program, (iii) a byte code program, (iv) a downloaded program that executes in a virtual machine environment, (v) a program that executes in a web browser, and
   B. maintaining with at least one of the control apparatus and a server digital data processor that is coupled thereto an object that stores the data value associated with the control apparatus,
   C. responding to a request for the object by transmitting to the client digital data processor that data value and one or more subsequent changes thereto.

12. A method of claim 11, comprising providing, with at least one of the control apparatus and the server digital data processor, services for any of (i) creating a named such object, (ii) destroying such an object, (iii) accessing information in such an object, (iv) updating information in such an object, (v) determining, from an object name, a physical address associated with such an object, and (vi) providing notification of changes in at least selected information stored in such an object.

13. A method of claim 12, comprising requesting such services with the client digital data processor, when configured as a process controller.

14. A method of claim 11, comprising providing, with at least one of the control apparatus and the server digital data processor, services for any of getting and setting a value of such object.

15. A method of claim 11, comprising communicating between the client digital data processor and the server digital data processor by a network.

16. A method of claim 11, comprising communicating between the server digital data processor and the control apparatus by any of a bus and a network.

* * * * *